(12) United States Patent
Yao

(10) Patent No.: US 8,340,396 B2
(45) Date of Patent: Dec. 25, 2012

(54) COLOR TRAPPING ON A HALFTONED BI-LEVEL BITMAP

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 457 days.

(21) Appl. No.: 12/754,096

(22) Filed: Apr. 5, 2010

(65) Prior Publication Data
US 2011/0243429 A1    Oct. 6, 2011

(51) Int. Cl.
*G06K 9/00* (2006.01)

(52) U.S. Cl. ....... 382/149; 382/165; 382/162; 358/3.06; 358/1.9; 358/1.8

(58) Field of Classification Search .................. 382/149, 382/165, 162; 358/1.14, 3.26, 3.06, 1.9
See application file for complete search history.

(56) References Cited

U.S. PATENT DOCUMENTS

| | | | |
|---|---|---|---|
| 5,131,058 A * | 7/1992 | Ting et al. ..................... | 382/162 |
| 6,377,711 B1 | 4/2002 | Morgana | |
| 7,684,087 B2 * | 3/2010 | Yao ............................. | 358/3.26 |
| 2003/0174352 A1 * | 9/2003 | Yamada et al. ................ | 358/1.9 |
| 2010/0277770 A1 * | 11/2010 | Yao ............................. | 358/3.06 |

OTHER PUBLICATIONS

U.S. Appl. No. 12/434,824; inventor Meng Yao, filed May 4, 2009.

* cited by examiner

*Primary Examiner* — Tarifur Chowdhury
*Assistant Examiner* — Isiaka Akanbi
(74) *Attorney, Agent, or Firm* — Philip E. Blair; Fleit Gibbons Gutman Bongini & Bianco P.L.

(57) ABSTRACT

What is disclosed is a novel system and method for determining whether a pixel resides along a two-color edge in a halftoned bi-level bitmap. In one embodiment, a bitmap having a plurality of colored pixels is received. For each pixel in the bitmap, a window of size n×m is defined centered on the current pixel. The window is partitioned into a plurality of regions with each region having an orientation direction with each orientation direction having an associated numeric value. A number of pixels are counted for each of the first and second colors in each of the associated orientation directions. A determination is made as to the respective orientation direction having the maximum and minimum pixel counts for each of the first and second colors. Thereafter, a determination is made whether the pixel resides along a two color edge based upon the max/min counts and each associated orientation direction.

20 Claims, 22 Drawing Sheets

| 1 (M) | 1 (M) | 2 (M) | 2 (C) | 3 (C) | 3 (C) |
|---|---|---|---|---|---|
| 1 (M) | 1 (M) | 2 (M) | 2 (C) | 3 (W) | 3 (C) |
| 4 (M) | 4 (M) | (X) (M) | 5 (C) | 6 (W) | 6 (C) |
| 4 (M) | 4 (M) | 5 (W) | 5 (C) | 6 (C) | 6 (C) |
| 7 (M) | 7 (M) | 8 (M) | 8 (C) | 9 (C) | 9 (C) |
| 7 (M) | 7 (M) | 8 (M) | 8 (C) | 9 (C) | 9 (C) |

*FIG. 8*

| (M) | (M) | (M) | (M) | (M) | (M) | (C) | (C) | (C) |
|---|---|---|---|---|---|---|---|---|
| (M) | (M) | (M) | (M) | (M) | (M) | (C) | (C) | (C) |
| (M) | (M) | (M) | (M) | (M) | (M) | (C) | (C) | (W) |
| (M) | (M) | (M) | (M) | (M) | (M) | (C) | (W) | (W) |
| (M) | (M) | (M) | (M) | X (M) | (W) | (C) | (W) | (W) |
| (M) | (M) | (M) | (M) | (M) | (W) | (C) | (W) | (W) |
| (M) | (M) | (M) | (M) | (M) | (W) | (C) | (C) | (W) |
| (M) | (M) | (M) | (M) | (M) | (M) | (C) | (C) | (C) |
| (M) | (M) | (M) | (M) | (M) | (M) | (C) | (C) | (C) |

FIG. 9A

| (M) | (M) | (M) | | (M) | | (C) | (C) | (C) |
|---|---|---|---|---|---|---|---|---|
| (M) | (M) | (M) | | (M) | | (C) | (C) | (C) |
| (M) | (M) | (M) | | (M) | | (C) | (C) | (W) |
| | | | | | | | | |
| (M) | (M) | (M) | | X (M) | | (C) | (W) | (W) |
| | | | | | | | | |
| (M) | (M) | (M) | | (M) | | (C) | (C) | (W) |
| (M) | (M) | (M) | | (M) | | (C) | (C) | (C) |
| (M) | (M) | (M) | | (M) | | (C) | (C) | (C) |

| $R_0C_0$ (M) | $R_0C_1$ (C) | $R_0C_2$ (C) | $R_0C_3$ (C) | $R_0C_4$ (C) | $R_0C_5$ (W) | $R_0C_6$ (W) |
|---|---|---|---|---|---|---|
| $R_1C_0$ (M) | $R_1C_1$ (C) | $R_2C_2$ (C) | $R_3C_3$ (C) | $R_4C_4$ (C) | $R_5C_5$ (W) | $R_6C_6$ (W) |
| $R_2C_0$ (M) | $R_2C_1$ (C) | $R_2C_2$ (C) | $R_2C_3$ (C) | $R_2C_4$ (C) | $R_2C_5$ (W) | $R_2C_6$ (W) |
| $R_3C_0$ (M) | $R_3C_1$ (M) | $R_3C_2$ (C) | $R_3C_3$ (W) | $R_3C_4$ (W) | $R_3C_5$ (W) | $R_3C_6$ (W) |
| $R_4C_0$ (M) | $R_4C_1$ (M) | $R_4C_2$ (C) | $R_4C_3$ (C) | $R_4C_4$ (W) | $R_4C_5$ (W) | $R_4C_6$ (W) |
| $R_5C_0$ (W) | $R_5C_1$ (M) | $R_5C_2$ (C) | $R_5C_3$ (C) | $R_5C_4$ (C) | $R_5C_5$ (W) | $R_5C_6$ (W) |
| $R_6C_0$ (M) | $R_6C_1$ (M) | $R_6C_2$ (C) | $R_6C_3$ (C) | $R_6C_4$ (C) | $R_6C_5$ (W) | $R_6C_6$ (W) |

| $R_0C_0$ (M) | $R_0C_1$ (C) | $R_0C_2$ (C) | $R_0C_3$ (C) | $R_0C_4$ (C) | $R_0C_5$ (W) | $R_0C_6$ (W) |
|---|---|---|---|---|---|---|
| $R_1C_0$ (M) | $R_1C_1$ (C) | $R_2C_2$ (C) | $R_3C_3$ (C) | $R_4C_4$ (C) | $R_5C_5$ (W) | $R_6C_6$ (W) |
| $R_2C_0$ (M) | $R_2C_1$ (C) | $R_2C_2$ (C) | $R_2C_3$ (C) | $R_2C_4$ (C) | $R_2C_5$ (W) | $R_2C_6$ (W) |
| $R_3C_0$ (M) | $R_3C_1$ (M) | $R_3C_2$ (C) | $R_3C_3$ (W) | $R_3C_4$ (W) | $R_3C_5$ (W) | $R_3C_6$ (W) |
| $R_4C_0$ (M) | $R_4C_1$ (M) | $R_4C_2$ (C) | $R_4C_3$ (C) | $R_4C_4$ (W) | $R_4C_5$ (W) | $R_4C_6$ (W) |
| $R_5C_0$ (W) | $R_5C_1$ (M) | $R_5C_2$ (C) | $R_5C_3$ (C) | $R_5C_4$ (C) | $R_5C_5$ (W) | $R_5C_6$ (W) |
| $R_6C_0$ (M) | $R_6C_1$ (M) | $R_6C_2$ (C) | $R_6C_3$ (C) | $R_6C_4$ (C) | $R_6C_5$ (W) | $R_6C_6$ (W) |

FIG. 18B

| $R_0C_0$ (M) | $R_0C_1$ (C) | $R_0C_2$ (C) | $R_0C_3$ (C) | $R_0C_4$ (C) | $R_0C_5$ (W) | $R_0C_6$ (W) |
|---|---|---|---|---|---|---|
| $R_1C_0$ (M) | $R_1C_1$ (C) | $R_2C_2$ (C) | $R_3C_3$ (C) | $R_4C_4$ (C) | $R_5C_5$ (W) | $R_6C_6$ (W) |
| $R_2C_0$ (M) | $R_2C_1$ (C) | $R_2C_2$ (C) | $R_2C_3$ (C) | $R_2C_4$ (C) | $R_2C_5$ (W) | $R_2C_6$ (W) |
| $R_3C_0$ (M) | $R_3C_1$ (M) | $R_3C_2$ (C) | $R_3C_3$ (W) | $R_3C_4$ (W) | $R_3C_5$ (W) | $R_3C_6$ (W) |
| $R_4C_0$ (M) | $R_4C_1$ (M) | $R_4C_2$ (C) | $R_4C_3$ (C) | $R_4C_4$ (W) | $R_4C_5$ (W) | $R_4C_6$ (W) |
| $R_5C_0$ (W) | $R_5C_1$ (M) | $R_5C_2$ (C) | $R_5C_3$ (C) | $R_5C_4$ (C) | $R_5C_5$ (W) | $R_5C_6$ (W) |
| $R_6C_0$ (M) | $R_6C_1$ (M) | $R_6C_2$ (C) | $R_6C_3$ (C) | $R_6C_4$ (C) | $R_6C_5$ (W) | $R_6C_6$ (W) |

|  |  |  |  |  |  |  |
|---|---|---|---|---|---|---|
| R₀C₀ (M) | R₀C₁ (C) | R₀C₂ (C) | R₀C₃ (C) | R₀C₄ (C) | R₀C₅ (W) | R₀C₆ (W) |
| R₁C₀ (M) | R₁C₁ (C) | R₂C₂ (C) | R₃C₃ (C) | R₄C₄ (C) | R₅C₅ (W) | R₆C₆ (W) |
| R₂C₀ (M) | R₂C₁ (C) | R₂C₂ (C) | R₂C₃ (C) | R₂C₄ (C) | R₂C₅ (W) | R₂C₆ (W) |
| R₃C₀ (M) | R₃C₁ (M) | R₃C₂ (C) | R₃C₃ (W) | R₃C₄ (W) | R₃C₅ (W) | R₃C₆ (W) |
| R₄C₀ (M) | R₄C₁ (M) | R₄C₂ (C) | R₄C₃ (C) | R₄C₄ (W) | R₄C₅ (W) | R₄C₆ (W) |
| R₅C₀ (W) | R₅C₁ (M) | R₅C₂ (C) | R₅C₃ (C) | R₅C₄ (C) | R₅C₅ (W) | R₅C₆ (W) |
| R₆C₀ (M) | R₆C₁ (M) | R₆C₂ (C) | R₆C₃ (C) | R₆C₄ (C) | R₆C₅ (W) | R₆C₆ (W) |

FIG. 18C

|  |  |  |  |  |  |  |
|---|---|---|---|---|---|---|
| R₀C₀ (M) | R₀C₁ (C) | R₀C₂ (C) | R₀C₃ (C) | R₀C₄ (C) | R₀C₅ (W) | R₀C₆ (W) |
| R₁C₀ (M) | R₁C₁ (C) | R₂C₂ (C) | R₃C₃ (C) | R₄C₄ (C) | R₅C₅ (W) | R₆C₆ (W) |
| R₂C₀ (M) | R₂C₁ (C) | R₂C₂ (C) | R₂C₃ (C) | R₂C₄ (C) | R₂C₅ (W) | R₂C₆ (W) |
| R₃C₀ (M) | R₃C₁ (M) | R₃C₂ (C) | R₃C₃ (W) | R₃C₄ (W) | R₃C₅ (W) | R₃C₆ (W) |
| R₄C₀ (M) | R₄C₁ (M) | R₄C₂ (C) | R₄C₃ (C) | R₄C₄ (W) | R₄C₅ (W) | R₄C₆ (W) |
| R₅C₀ (W) | R₅C₁ (M) | R₅C₂ (C) | R₅C₃ (C) | R₅C₄ (C) | R₅C₅ (W) | R₅C₆ (W) |
| R₆C₀ (M) | R₆C₁ (M) | R₆C₂ (C) | R₆C₃ (C) | R₆C₄ (C) | R₆C₅ (W) | R₆C₆ (W) |

FIG. 18D

|     |     |     |     |     |     |     |     |     |     |
| --- | --- | --- | --- | --- | --- | --- | --- | --- | --- |
| (M) | (M) | (C) | (C) | (C) | (C) | (C) | (W) | (W) | (W) |
| (M) | (M) | (C) | (C) | (C) | (C) | (W) | (W) | (W) | (W) |
| (M) | (M) | (C) | (C) | (C) | (C) | (W) | (W) | (W) | (W) |
| (M) | (M) | (C) | (C) | (C) | (C) | (W) | (W) | (W) | (W) |
| (M) | (M) | (C) | (C) | (C) | (M) | (W) | (W) | (W) | (W) |
| (M) | (M) | (M) | (C) | (W) | (M) | (W) | (W) | (W) | (W) |
| (M) | (M) | (M) | (C) | (C) | (W) | (W) | (W) | (W) | (W) |
| (M) | (W) | (M) | (C) | (C) | (C) | (W) | (W) | (W) | (W) |
| (M) | (M) | (M) | (C) | (C) | (C) | (W) | (W) | (W) | (W) |
| (M) | (M) | (M) | (C) | (C) | (C) | (W) | (W) | (W) | (W) |

FIG. 19A

| E11 | E12 | E13 | E14 | E15 |
| --- | --- | --- | --- | --- |
| E21 | E22 | E23 | E24 | E25 |
| E31 | E32 | E33 | E34 | E35 |
| E41 | E42 | E43 | E44 | E45 |
| E51 | E52 | E53 | E54 | E55 |

FIG. 19B

| F11 | F12 | F13 | F14 | F15 |
| --- | --- | --- | --- | --- |
| F21 | F22 | F23 | F24 | F25 |
| F31 | F32 | F33 | F34 | F35 |
| F41 | F42 | F43 | F44 | F45 |
| F51 | F52 | F53 | F54 | F55 |

FIG. 19C

COLOR TRAPPING ON A HALFTONED BI-LEVEL BITMAP

CROSS REFERENCE TO RELATED APPLICATION

The present patent application is related to co-pending and commonly assigned U.S. patent application Ser. No. 12/434,824, entitled "Color Trapping On A Halftoned Bi-level Bitmap", the entire teachings of which are incorporated herein by reference.

TECHNICAL FIELD

The present invention is directed to systems and methods for qualifying color pixels on a halftoned bi-level bitmap for color trapping in a digital imaging system.

BACKGROUND

In computer graphics, the term "bitmap" means "map of bits" or a spatially mapped array of bits, and refers to a type of file format used to store digital images. Raster images in general may be referred to as bitmaps whether synthetic or photographic, in files or in memory. In some contexts, the term bitmap implies one bit per pixel, while the term "pixmap" is used for images with multiple bits per pixel. Halftone prints can be produced from bi-level images that indicate the presence or absence of ink at a particular location within the image. Variation of halftone dot sizes controls tonal values within a clustered-dot halftone print. A halftone image file can be viewed as a bitmap. Each bit is used to indicate whether a pixel is on or off.

Color halftone printing devices make use of different channels, e.g., Cyan (C), Magenta (M), Yellow (Y), and Black (K), to define colors. Thus, color halftone prints may include a plurality of monochromatic bitmaps. Each monochromatic bitmap defines the presence or absence of dots for a particular channel. Color management techniques may be applied to halftone prints by modification of contone image data prior to halftoning. Color management via modification of contone image data requires that pages be rendered twice, once for a proof and once for printing plates. However, rendering pages twice can result in different dot structures on the proof and the plates.

When printing, for example, using a color inkjet printer, the color is applied at once to the paper. Each color generally ends up where it is expected. When printing, in commercial printing presses, a document consisting of more than one color of ink requires that the single page pass through the printing press multiple times as each color is applied to the paper. Sometimes the paper or the plates applying the ink shift. It might be a tiny shift but sufficient to be noticeable. For example, a white gap may appear between a cyan letter that is supposed to be touching a magenta box. When this happens, the color is said to be out-of-register. Color-to-color misregistration refers to misregistration between color separations in a printed image. Such misregistration in printed halftoned images can result in image defects, a primary one being white gaps between color edges.

Methods for correcting for misregistration are known. The general approach is to expand one of the abutting regions' separations to fill the gap or misregistration border region with a color determined to minimize the visual effect when printed. Borders or edges expanded from a region of one color to another in this manner are said to be "spread". A border which has been expanded is referred to as a "trap", and the zone within which color is added is called the "trap zone". Misregistration of colors in a printing device can, in some instances, be compensated for by color "trapping". Trapping is the process of compensating for misregistration by printing small areas of overlapping color where different colored objects meet. Trapping makes these gaps less noticeable, even invisible. Trapping is often accomplished with features built into software algorithms devoted to trapping methods. Many commercial printing devices perform a trapping method.

One trapping method is to simply print using all one color or never allow your colors to touch or get too close. This may not be practical for many print jobs. Another approach is to intentionally print one layer of ink on top of another. This is called overprinting (also known as surprinting). Overprinting is used to help avoid the need for color trapping by intentionally avoiding gaps between touching colors. Depending on the colors printed, varying degrees of noticeable changes may arise in color where the two objects overprint. In some instances, overprinting may be desirable and the results better than trapping. Small amounts of overprinting are often less noticeable than the white space that might occur with untrapped knockouts and may be easier to achieve than trying to set a perfect trap. Overprinting is usually not suitable for non-black colors. For example, when dealing with a cyan and a magenta border, using overprint will change one of the colors to blue due to overlapping of cyan and magenta.

Many image documents are RIP'ed to bi-level data out of considerations for memory and performance. RIP'ing means to be Raster Image Processed. Raster image processing turns vector digital information, such as a PostScript file, into a high-resolution raster image (RIP'ed bi-level bitmap). A Raster Image Processor (RIP) is a relatively common component in document reproduction systems.

Accordingly, what is needed in this art is a color trapping algorithm based upon a halftoned high-resolution bi-level bitmap to effectively deal with color misregistration in complex digital document reproduction devices and to reduce other engine artifacts, such as trailing edge detection, where color intensity falls off sharply at the trailing edge.

BRIEF SUMMARY

What is disclosed is a novel system and method for determining whether a pixel resides along a two color edge. The present method provides a rigorous checking method to prevent trapping in white regions bordering a two-color edge, a more robust edge detection with pixel counts as well as orientation conditions, and more accurate color estimating through non-linear filtering. The present method deals effectively with color misregistration in complex digital document reproduction devices to reduce engine artifacts, such as trailing edge detection, where color intensity falls off sharply at the trailing edge. Asymmetrical and multi-pixel trapping along differing dimensions is also enabled.

In one embodiment, a bitmap of a halftoned bi-level image is received having a plurality of colored pixels. For each pixel in the bitmap, a window of size n×m is defined which is centered on the pixel. The window is partitioned into a plurality of regions with each region having an orientation direction with each orientation direction having an associated numeric value. A number of pixels are counted for each of the first and second colors in each of the associated orientation directions. A determination is made as to the respective orientation direction having the maximum and minimum pixel counts for each of the first and second colors. Thereafter, a determination is made whether the pixel resides along a two color edge based upon the maximum and minimum pixel counts and the orientation directions associated with the maximum and minimum pixel counts. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIGS. 5A-D collectively illustrate one embodiment of how a pixel is qualified for trapping on a cyan-magenta edge;

FIGS. 6A-D further illustrate the embodiment of FIGS. 5A-D;

FIGS. 7A-D show an example 7×7 window to help explain how a candidate pixel is qualified for trapping on a cyan-magenta edge;

FIG. 8 shows an example embodiment of estimating a contone value for the qualified edge pixel;

FIGS. 9A-B shows one example 9×9 window to help explain how a candidate pixel is qualified as an edge pixel eligible for color trapping;

FIGS. 10A-C further illustrate the embodiment of FIGS. 9A-B;

FIG. 11 shows an example 13×13 window wherein alternating rows and columns immediately adjacent the candidate pixel "X" have been deleted in accordance with an alternative embodiment hereof;

FIGS. 12A-B shows a candidate cyan pixel "X" being qualified along a vertically-oriented two-color edge;

FIGS. 13A-B shows a candidate cyan pixel "X" being qualified along a horizontally-oriented two-color edge;

FIG. 17 illustrates a 7×7 window labeled in row/column format;

FIGS. 18A-D illustrate another embodiment wherein the 7×7 window of FIG. 17 is divided into a plurality of regions based upon their respective compass locations;

FIGS. 19A-C show a 10×10 window of pixels, the corresponding 2×2 estimate windows, and the corresponding intermediate estimate windows;

DETAILED DESCRIPTION

Figure 1:
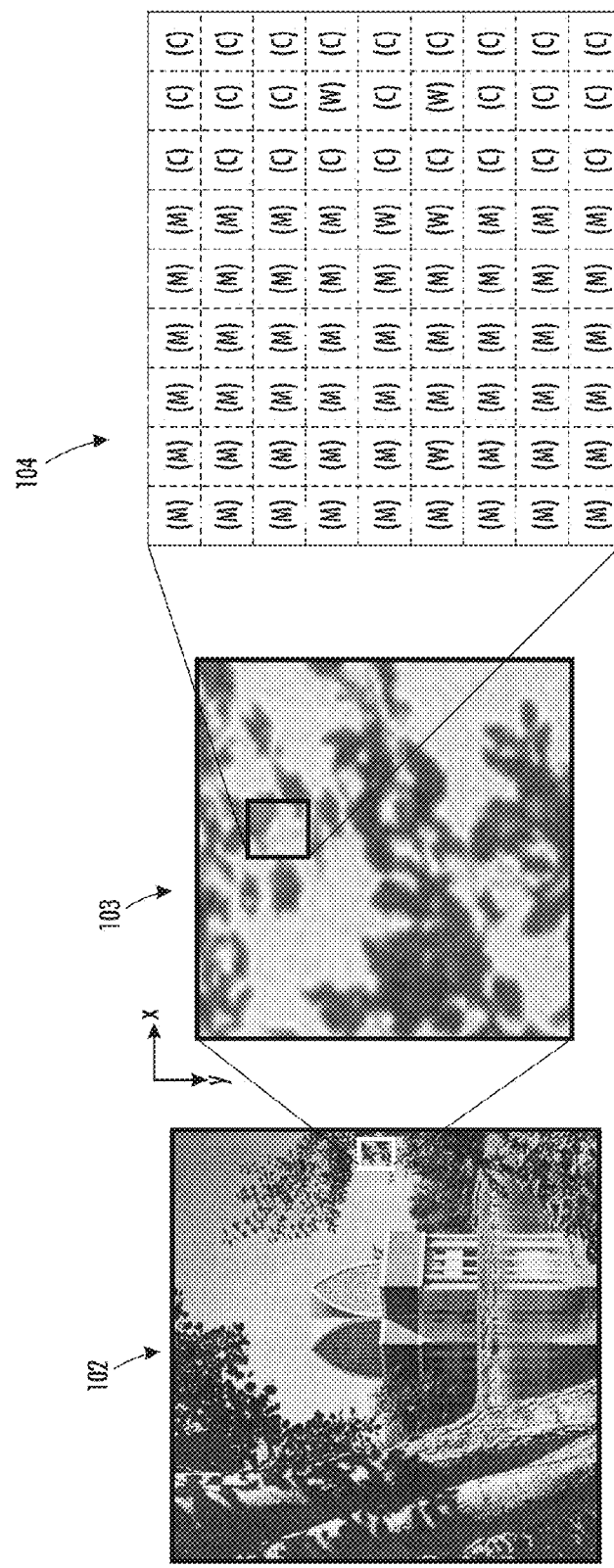
FIG. 1 illustrates an example received bitmap of a halftoned color image.

What is disclosed is novel system and method for color trapping based upon a halftoned high-resolution bi-level bitmap. The method hereof provides a rigorous checking method to prevent trapping in white regions bordering a two-color edge, a more robust edge detection with pixel counts as well as orientation conditions, and more accurate color estimating through non-linear filtering. The present method deals effectively with color misregistration in complex digital document reproduction devices to reduce engine artifacts, such as trailing edge detection, where color intensity falls off sharply at the trailing edge. Asymmetrical and multi-pixel trapping along differing dimensions is also enabled.

It should be understood that one of ordinary skill in this art would be readily familiar with many facets of color science such as, but not limited to, color space, raster image processing, raster graphics, bi-level bitmaps, halftones and halftoning methods, and other techniques generally known in the color science arts. Those of ordinary skill would be familiar with the text: "*Digital Color Imaging Handbook*", $1^{st}$ Ed., CRC Press (2003), ISBN-13: 9780849309007, and "*Control of Color Imaging Systems: Analysis and Design*", CRC Press (2009), ISBN-13: 9780849337468, both of which are incorporated herein in their entirety by reference. One of ordinary skill would also be knowledgeable about computer science and hardware and software systems and methods sufficient to implement various aspects of the methods described herein in their own environments without undue experimentation.

Non-Limiting Definitions:

An "image", as used herein, refers to a pattern of physical light comprised of known colors of the light spectrum which are visible by the human eye. When reduced to print, the image generally comprises a plurality of colored pixels arrayed on a media substrate or display device. A printed image (or image print) would be a photograph, plot, chart, and the like, as are generally known. When an image is rendered to a memory or storage, the values of the color pixels are generally stored in any of a variety of formats such as BMP, JPEG, GIF, TIFF, or other formats employed for storing image data on a storage media.

A "bitmap" or "raster graphics image", or simply "raster image", is a data structure representing a generally rectangular grid of pixels or points of color values. Raster images are stored in image files using a defined format. A bitmap of an image corresponds bit-for-bit with the original image, generally in a same format used in the display's video memory, or maybe as a device-independent bitmap. The bitmap is characterized by the width and height (X and Y dimensions) of the image in pixels and by the number of bits-per-pixel (a color depth, which determines the number of colors it can represent).

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr. An "adjacent pixel" is a pixel which borders a given pixel.

"Edge detection" is to a method for identifying areas in an image at which the image changes or has discontinuities. A typical edge might be, for instance, a border between a region of magenta and cyan. There are many methods for edge detection. Most can be grouped into two categories, search-based and zero-crossing based. Search-based methods detect edges by first computing a measure of edge strength, usually a first-order derivative expression such as the gradient magnitude, and then searching for local directional maxima of the gradient magnitude using a computed estimate of the local orientation of the edge, usually the gradient direction. Zero-crossing based methods search for zero crossings in a second-order derivative expression computed from the image in order to find edges, usually the zero-crossings of the Laplacian or the zero-crossings of a non-linear differential expression. As a pre-processing step to edge detection, a smoothing stage, typically Gaussian smoothing, is usually applied. The edge detection methods that have been published mainly differ in the types of smoothing filters that are applied and the way the measures of edge strength are computed. As many edge detection methods rely on the computation of image gradients, they also differ in the types of filters used for computing gradient estimates in the x- and y-directions.

A "cyan edge pixel" is an edge pixel on the cyan side of a cyan-magenta edge. Such a pixel can be a cyan pixel or any color pixel which is not a magenta pixel (or which contains magenta) such as, for example, a white pixel. Likewise, a "magenta edge pixel" is a pixel on the magenta side of a cyan-magenta edge. Such a pixel can be a magenta pixel, or any other color pixel which is not a cyan pixel (or which contains cyan).

"Trapping" is a term of art which generically describes a hardware and/or software process used to compensate for the small amount that the paper tends to wander as it travels through a printing press. Trapping compensates for mechanical shifts or stretching of paper or plates in the printing process and provides an overlap of colors to prevent unprinted paper from showing in the final printed product. This is not to be confused with the terms "wet trapping" or "dry trapping" which describe behaviors between inks or between ink and paper. Trapping helps preserve the integrity or the shape of an image such as block serifs. As such, without trapping unsightly gaps are likely to appear between two colors that are supposed to be touching. With trapping, one color is made to overlap the other by extending that color into a surrounding area. This allows the colors to keep touching one another, even as the paper wanders. In simple trapping, where two colors are involved, the submissive color is spread into the dominant color.

"Dominant" and "Submissive" colors. Darker dominant colors generally define the size and shape of an image. The weight, or luminosity, of each color determines which color is dominant and which color is submissive. Darker or stronger colors tend to be dominant colors and lighter or weaker colors tend to be submissive colors. For instance, cyan is a dominant color and yellow is a submissive color. A submissive color is less visible when spread into an area of a dominant color than if a dominant color is spread into an area of submissive color. Submissive colors change in reaction to the dominant color whereas dominant colors tend to generally remain unchanged. For example, a dominant cyan remains unchanged while a submissive yellow is spread outward into the area where the two colors come into contact, thus creating a trap. When one color totally surrounds another, these must have either a choke or spread relationship. When a dominant color is surrounded by a submissive color, the object represented by the dominant color is choked because it gets smaller due to the invasion of the submissive color. Conversely, when a submissive color is surrounded by a dominant color, it spreads into the dominant color. There are many ways of determining whether a given color is dominant or submissive. One simple method is to print one or more colors and then photocopy the proof. The colors can be transformed into grayscales and visually analyzed for relative darkness. Another method is to determine a given color's neutral density based upon well established industry standards for density readings of colors. Another method uses R, G, B components to determine relative darkness by applying the following formula: Luminosity=(0.3*Red)+(0.59*Green)+(0.11*Blue). Various aspects of color perception are subjective. Therefore, it is suggested that trapping decision tables be implemented and the colors therein adjusted for specific situations depending on the color processing environments wherein the present method is implemented.

"Cyan trapping", or "trapping a cyan edge pixel" along a cyan-magenta boundary refers to extending magenta into a qualified cyan edge pixel. Likewise, "magenta trapping", or "trapping a magenta edge pixel" along a magenta-cyan boundary refers to extending cyan into a qualified magenta edge pixel. For example, if a magenta pixel is trapped, cyan is extended into the magenta area by an amount equivalent to one pixel, i.e., the pixel trapped was on the magenta side of the edge. For more than one pixel trapping, cyan is extended into the magenta area as well as magenta into the cyan area. For trapping an even number of pixels, the number of pixels trapped on the cyan side and magenta side of the edge are equal. For example, in 4-pixel trapping, two pixels on a cyan side of an edge, as well as two pixels on the magenta side of the edge, are trapped. For trapping an odd number of pixels, the number of pixels to be trapped will be split evenly on the cyan side of the edge and magenta side of the edge as much as possible, and the extra pixel will be trapped on the magenta side of the edge. For 3-pixel trapping, for instance, two pixels will be trapped on the magenta side of the edge (extend cyan into the magenta area by two pixels), and one pixel will be trapped on the cyan side of the edge (extend magenta into the cyan area by one pixel). The number of trapped pixels in the X and Y dimensions can be specified separately.

An "image input device" is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). A signal of the scanned image data is produced by the scanning device. Such a digital signal contains information about pixels such as color value, intensity, and their location within the scanned image.

An "image output device" is any device capable of rendering the image. The set of image output devices includes digital document reproduction equipment and other xerographic copier systems as are widely known in commerce, photographic production and reproduction equipment, monitors and other displays, computer workstations and servers, including a wide variety of color marking devices, and the like. An inkjet printer is one example color marking device which produces an image from a received signal of image data by the visual integration of color inks deposited onto a media substrate.

To "render" an image is to reduce the image data (or a signal thereof) to viewable form; store the image data to memory or a storage device for subsequent retrieval; or communicate the image data to another device. Such communication may take the form of transmitting a digital signal of the image data over a network.

A "contone" is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones.

The term "halftoning" means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications. Due to their stability and predictability, clustered dot halftoning is one of the primary choices for xerographic printing systems. Traditional clustered dot halftones were restricted to a single frequency because they were generated using periodic gratings that could not be readily varied spatially. Halftoning techniques are widely employed in the printing and display of digital images and are necessary because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

The following discussion assumes at least a 3-color device capable of printing: cyan, magenta, and yellow, on a white background. The bitmap image has already been halftoned and information regarding the halftone screens used to halftone the image have been preserved. The color of each pixel in the example windows (grids) of the accompanying drawings are labeled in parenthesis. For instance, a pixel labeled '(M)' represents a magenta pixel. A pixel labeled '(C)' is cyan pixel. The label '(W)' refers to a white pixel. The current pixel under consideration as being a possible candidate for color trapping according to the present method, is labeled 'X'. A pixel does not have to be cyan or magenta to be a candidate for color trapping as will become more clear herein further. It should be appreciated that although the description hereof focuses on cyan-magenta trapping, the teachings hereof can be applied to cyan-yellow trapping, or magenta-yellow trapping. Black trapping can be achieved using a much simpler algorithm.

Reference is being made briefly to FIG. 1 which illustrates an example color image shown as a gray level image. As shown, image subsection 103 represents a small section of image 102. Subsection 104 represents an even smaller subsection of image subsection 103. Subsection 104 illustrates the individual pixels (cells). FIG. 1 is intended to illustrate one example origin of the pixels of an image as discussed herein. It should be appreciated that the various sections of FIG. 1 are illustrative.

Example Flow Diagram of One Embodiment

Figure 2:
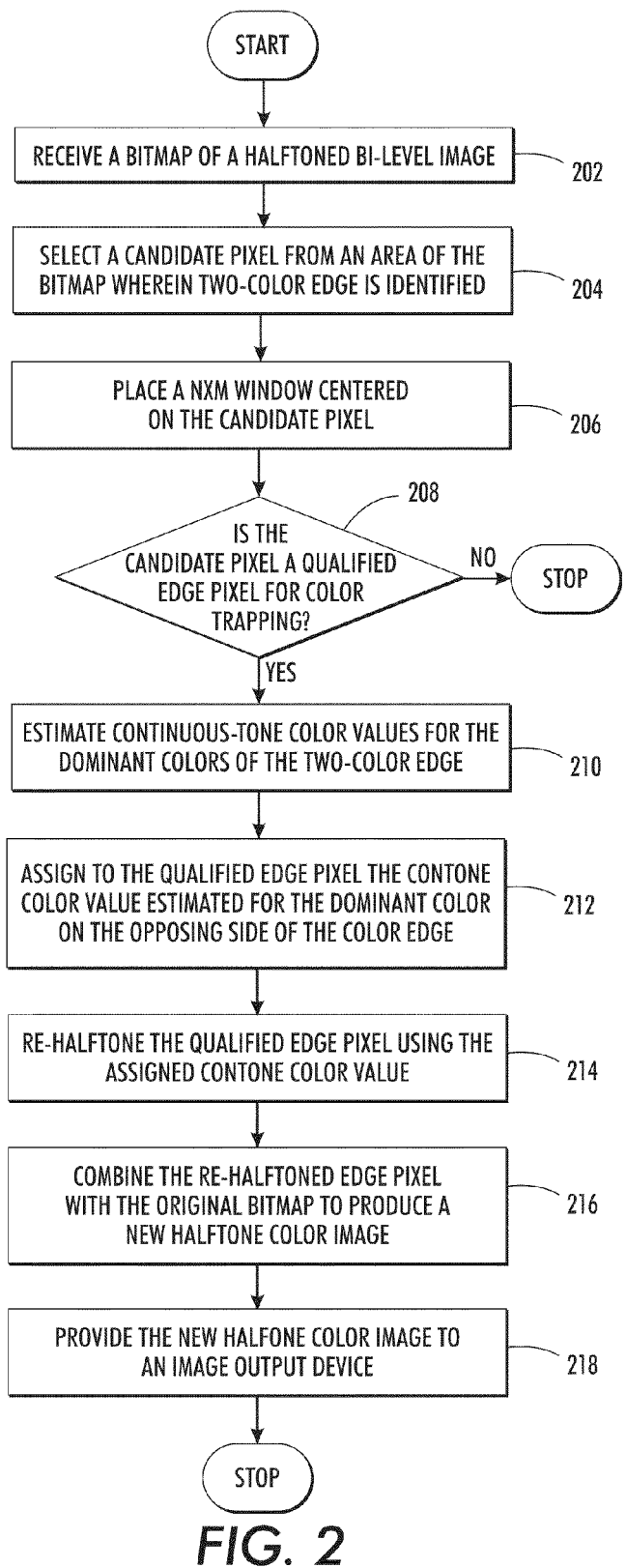
FIG. 2 illustrates a flow diagram of one example embodiment of color trapping.

Reference is now being made to the flow diagram of FIG. 2 which illustrates one example embodiment of the present color trapping method wherein a single edge pixel is qualified for color trapping along a two-color edge. It should be fully appreciated that, after an edge pixel has been qualified, more pixels in the bitmap are selected as candidate pixels, qualified and processed accordingly, until all edge pixels in the received bitmap have been processed. The flow diagram of FIG. 2 is intended to illustrate a single iteration of the present color trapping method. Various aspects of the flow diagrams of the present method, and further iterations which process all edge pixels in the received bitmap, are discussed in greater detail with respect to the flow diagrams of FIGS. 3-4 and the embodiments of FIGS. 5-14.

In the example flow diagram of the present color trapping method of FIG. 2, at 202, a bitmap of a halftoned bi-level image is received. At 204, a candidate pixel is selected from an area of the bitmap wherein a two-color edge is identified. The candidate pixel is a pixel which resides along a two-color edge. One method for determining whether a given pixel resides along a two-color edge in a bi-level bitmap is discussed herein further with respect to the flow diagram of FIG. 16. The two-color edge has a first side of a first dominant color and a second side of a second dominant color. For example, in an area of the bitmap having a cyan-magenta two-color edge, the first side of the two-color edge would comprise an area of a dominant cyan color and the second side of the two-color edge would comprise an area of a dominant magenta area. The candidate pixel is to be qualified as an edge pixel eligible for color trapping in accordance herewith. At 206, a window of size n×m is placed centered about the candidate pixel. At 208, a determination is made whether the candidate pixel is an edge pixel qualified for color trapping based upon the color values of pixels in the window. If the candidate pixel is not a qualified edge pixel then further processing stops. If the candidate pixel is a qualified edge pixel then, at 210, contone color values are estimated for the dominant colors of the two-color edge. Estimation of contone values is based upon the halftone threshold values used to color the area of the bitmap wherein the candidate pixel was selected. At 212, the estimated contone color value for the dominant color on the opposing side of the color edge (i.e., the opposite side of the edge wherein the candidate pixel resides) is assigned to the qualified edge pixel. At 214, the qualified edge pixel is re-halftoned using the assigned contone color value. At 216, the re-halftoned edge pixel is combined with the original bitmap to produce a new halftoned color image. At 218, the new halftoned color image is then provided to an image output device wherein the color image is rendered. Thereafter, further processing stops.

Figure 3:
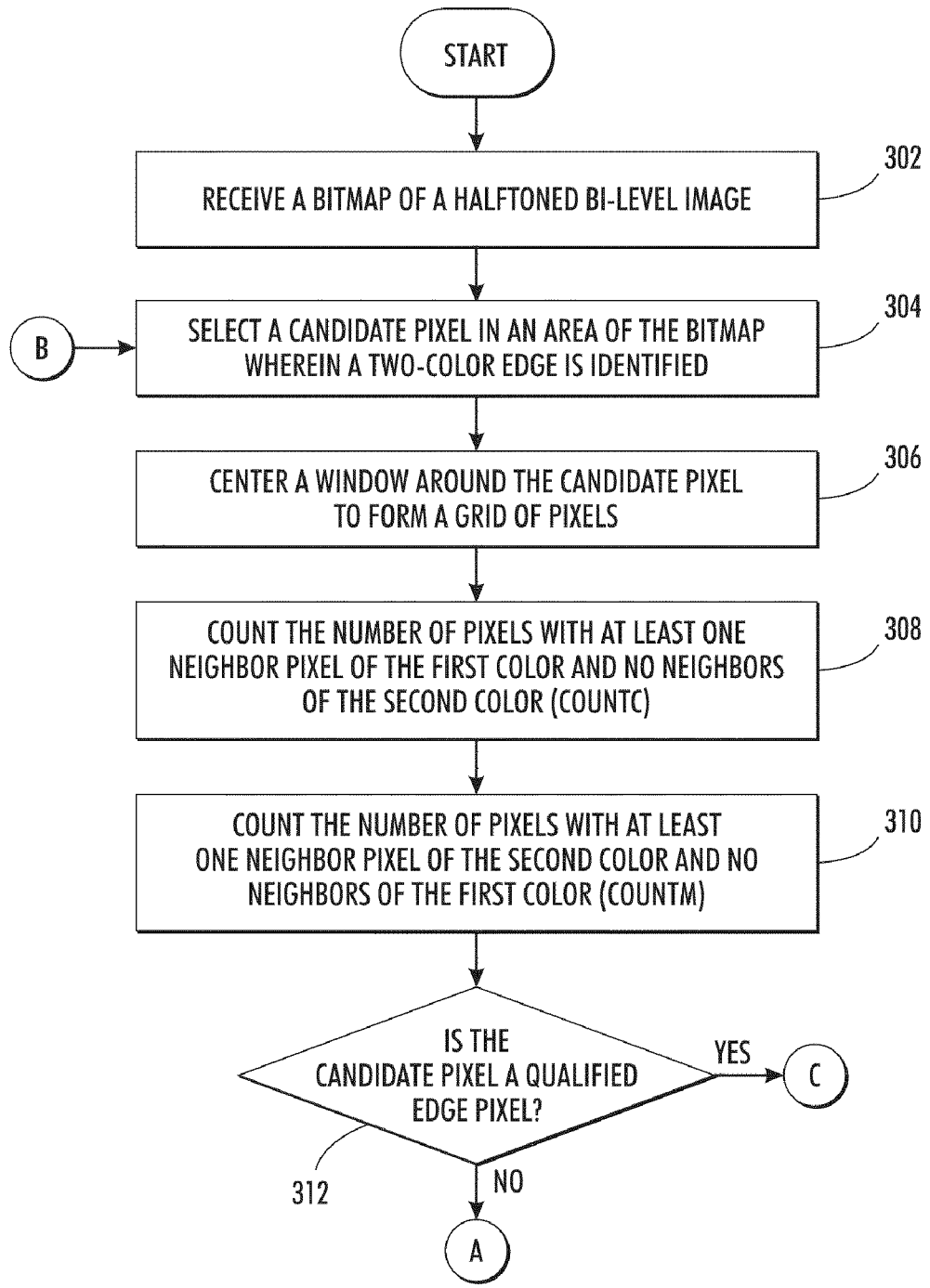
FIG. 3 illustrates a flow diagram of another embodiment of color trapping.

Reference is now being made to the flow diagram of FIG. 3 which illustrates another embodiment of the present color trapping method.

At 302, a bitmap of a halftoned bi-level image is received. The bitmap can be received from a raster image processor after having been RIP'ed in a manner generally known in the arts, or retrieved from a memory or storage. The received bitmap comprises a plurality of pixels each having a color value associated therewith.

At 304, a candidate pixel is selected from an area of the bitmap wherein a two-color edge is identified. The candidate pixel is a pixel which resides along a two-color edge. One method for determining whether a given pixel resides along a two-color edge in a bi-level bitmap is discussed herein further with respect to the flow diagram of FIG. 16. The candidate pixel is to be qualified as an edge pixel eligible for color trapping. The two-color edge has a first side of a first color and a second side of a second color. The two-color edge can be any of a cyan-magenta edge, a cyan-yellow edge, a magenta-yellow edge, or any color which borders black, for example, a black-cyan edge. If the two-color edge is a cyan-magenta edge, for instance, then the first side of the two-color edge would be an area of the bitmap dominated by the first color cyan and the second side of the two-color edge would be an area dominated by the second color magenta. Preferably a cyan-magenta edge is selected because such edges tend to produce more visible artifacts caused by misregistration or from other engine artifacts. Artifacts along cyan-yellow edges or at magenta-yellow edges tend to be less visible due to the relatively low visibility of the yellow.

At 306, a window of size n×m is centered on the candidate pixel. In one embodiment, the window forms a 5×5 grid defining a neighborhood of pixels surrounding the candidate pixel. The size of the window may be adjusted based upon a distance (in pixels) the candidate pixel is from the two-color edge. The window does not have to be a square (n=m) as will be discussed herein further with respect to the embodiments of FIGS. 13-15.

At 308, the number of pixels in the window are counted which have at least one adjacent pixel of the first color (for example, cyan in the cyan-magenta edge) and no adjacent pixels of the second color (for example, magenta in the cyan-magenta edge). This produces a first count, countC.

At 310, the number of pixels in the window are counted which have at least one adjacent pixel of the second color (for example, magenta in the cyan-magenta edge) and no adjacent pixels of the first color (for example, cyan in the cyan-magenta edge). This produces a second count, countM. The first and second counts (countC and countM) are used to qualify the candidate pixel as an edge pixel eligible for color trapping. Various embodiments for qualifying pixels are discussed herein further.

At 312, a determination is made whether the candidate pixel is a qualified edge pixel eligible for color trapping on the two-color edge. To qualify the candidate pixel "X" as an edge pixel eligible for trapping on a magenta side of a cyan-magenta edge, the relationship of Eq. 1 (discussed herein further) must be satisfied. To qualify the candidate pixel "X" as an edge pixel eligible for trapping on a cyan side of the cyan-magenta edge, the relationship of Eq. 2 (discussed herein further) must be satisfied. If not a qualified edge pixel, then processing proceeds with respect to node A of FIG. 4. Otherwise, if the candidate pixel is a qualified edge pixel then processing proceeds with respect to node C of FIG. 4.

Figure 4:
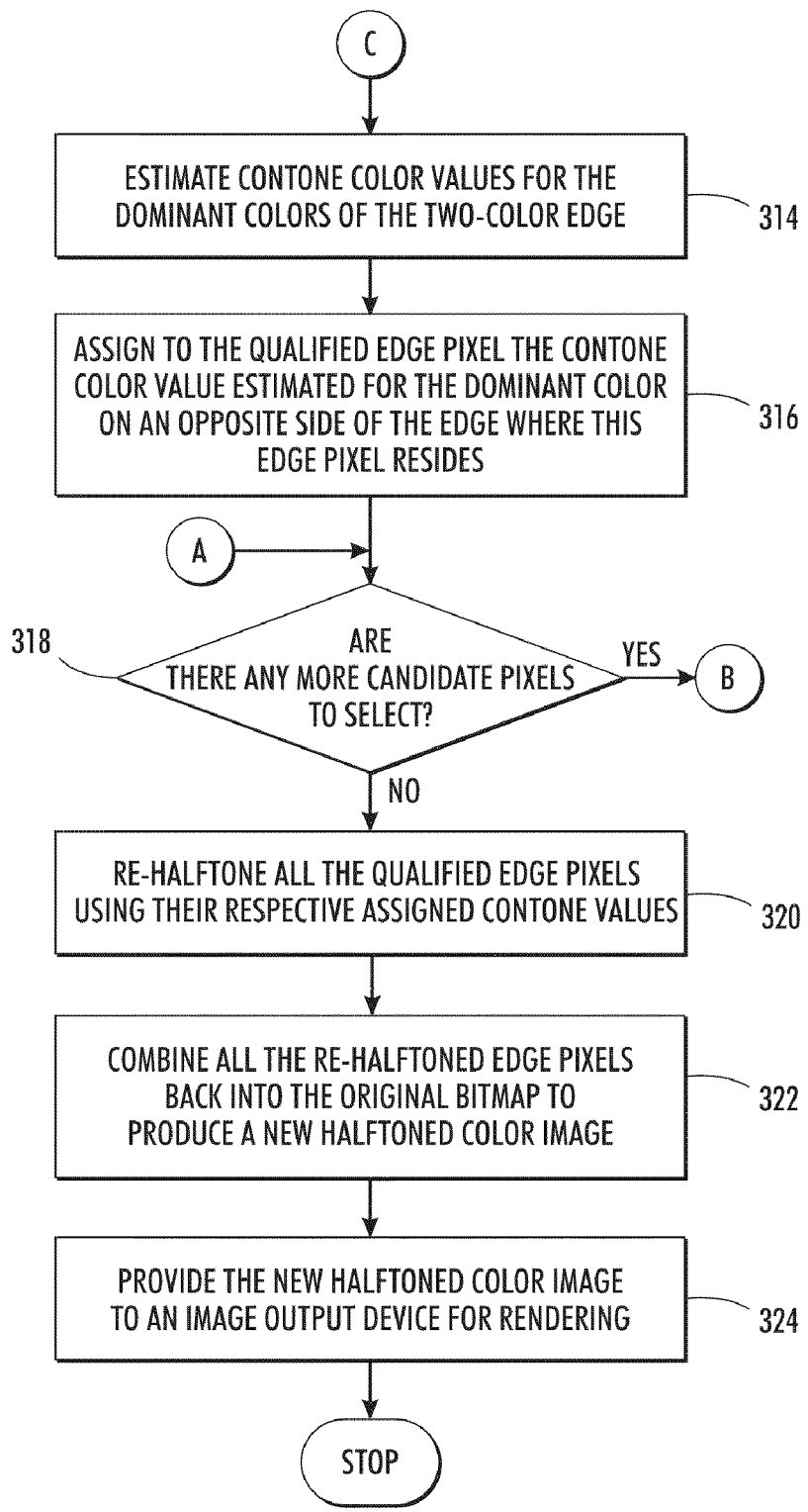
FIG. 4 is a continuation of the flow diagram of FIG. 3 with processing continuing with respect to node A.

Reference is now made to the flow diagram of FIG. 4 which is a continuation of the flow diagram of FIG. 3 with processing continuing with respect to node A.

At 314, contone color values are estimated for each of the dominant colors of the two-color edge. Contone values are estimated based upon the halftone threshold values of the halftone screens used to color this area of the bitmap from which the candidate pixel was selected.

At 316, the estimated contone color value for the dominant color on the opposing side of the two-color edge is assigned to the qualified edge pixel (the current candidate pixel). Methods for estimating the contone value are provided herein further. The estimated contone color value may be different than the original contone color.

At 318, a determination is made whether there are any more pixels to be selected as candidate pixels. If so, then processing repeats with respect to node B of FIG. 3 wherein, at 304, another candidate pixel is selected. Otherwise, at 320, the qualified edge pixels are re-halftoned using their assigned contone color values. Just the qualified edge pixels are re-halftoned. This is achieved by comparing their estimated contone values against their corresponding halftone threshold values.

At 322, the re-halftoned edge pixels are combined with the original bitmap of the color image to produce a new halftoned color image. In one embodiment, these values are logically OR'd into the original bitmap.

At 324, the new halftoned color image is provided to an image output device wherein the color image is rendered or stored for subsequent retrieval. Thereafter, further processing stops.

Reference is now made to FIGS. 5A-D which illustrate a portion of a first embodiment of qualifying a candidate pixel as an edge pixel eligible for color trapping. The window of pixels in each of FIGS. 5A-D are intended to be representative of a small area of subsection 103 of image 102 (similar to the window of pixels shown in subsection 104) of FIG. 1. Each of the pixels in the window has a color value indicated by the letter placed at the center of each pixel, magenta (M), cyan (C), and white (W).

Figures 5A, 5B, 5C, 5D:
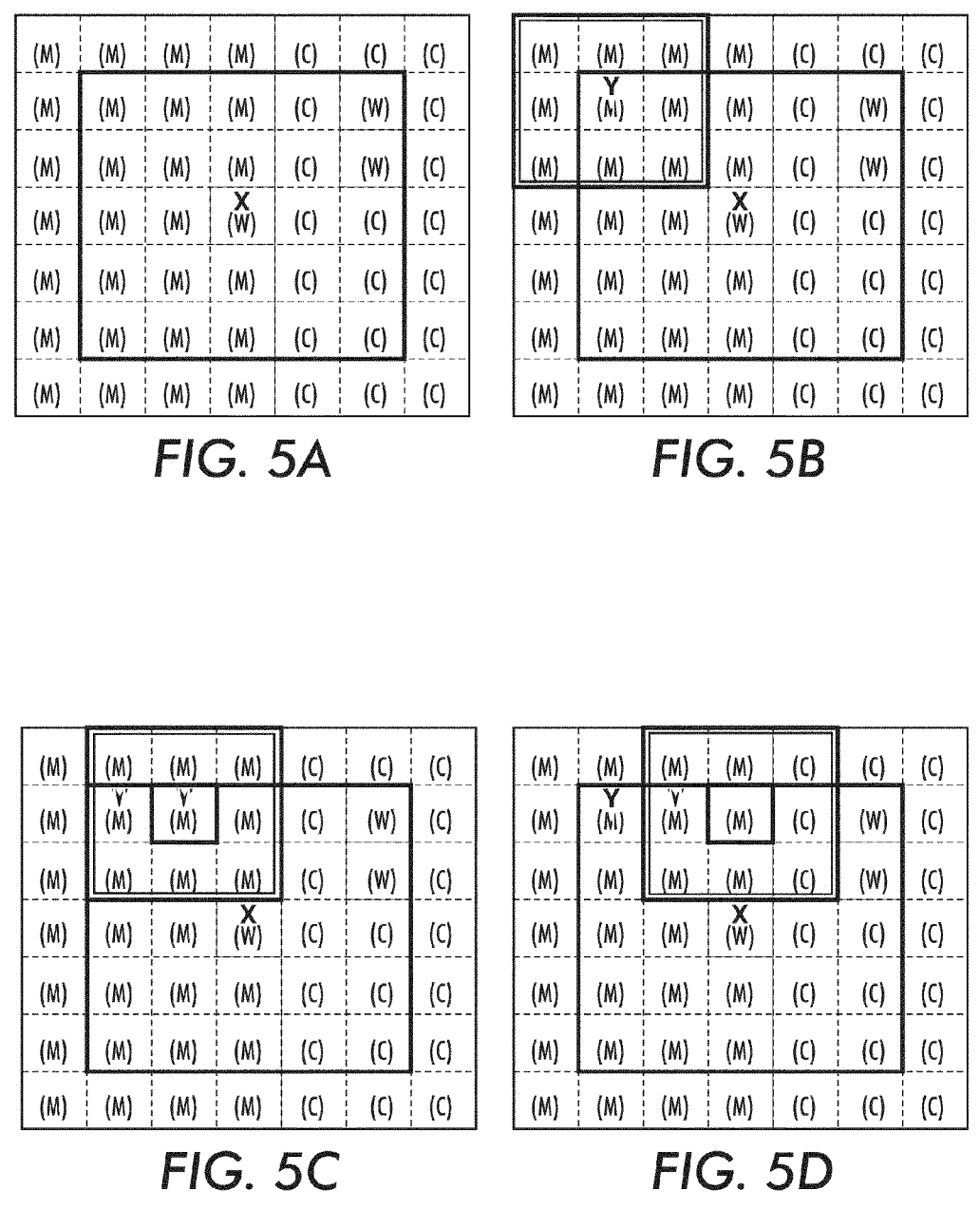

In FIG. 5A, a plurality of magenta pixels are shown arrayed adjacent to a plurality of cyan pixels representing a section of a vertical edge of a cyan-magenta two-color edge. The window has a white center pixel "X" and two white pixels in an area of dominant cyan. A 7×7 window of pixels is used because, in one embodiment, a 5×5 window is centered on candidate pixel "X" and a 3×3 window is used to define a neighborhood of pixels around a given pixel in the window. This requires a 7×7 window because a 5×5 window around the center pixel requires an additional two rows and two columns to encompass all pixels in any given 3×3 neighborhood.

In FIG. 5B, a 3×3 window is shown having been placed around the pixel in the upper left corner of the 5×5 window. The 3×3 neighborhood window is progressively shifted around each pixel in the 5×5 window. As the 3×3 window is shifted, a determination is made whether the pixel at the center of the 3×3 window has at least one adjacent cyan (first color) pixel but no adjacent magenta (second color) pixels in the two-color edge. If so, then the pixel at the center of the 3×3 window is labeled "Z". Otherwise, a determination is made whether the pixel in the center of the 3×3 window has at least one adjacent magenta pixel but no adjacent cyan pixels. If so, then the pixel at the center of the 3×3 window is labeled "Y". Other labeling schemes may be used. Otherwise, the pixel is given no label at all. Once the center pixel has been labeled, the 3×3 window is shifted to the next pixel in the 5×5 window. In FIG. 5B, the pixel at the center of the current 3×3 window is a magenta (M) pixel. A determination is made whether this pixel has at least one adjacent cyan pixel but no adjacent magenta pixels. This pixel has adjacent magenta pixels, so this pixel cannot be labeled "Z". Next, a determination is made whether this pixel has at least one adjacent magenta pixel and no adjacent cyan pixels. This pixel has one adjacent magenta pixel and no adjacent cyan pixels. So, this pixel is labeled "Y". Thereafter, the 3×3 window is shifted to the next pixel to the right in the top row of the 5×5 window and the above determination repeats for the next pixel located at the center of the 3×3 window.

In FIG. 5C, the 3×3 window has been shifted to the next pixel. The pixel at the center of the current 3×3 window is also a magenta (M) pixel. A determination is made whether this pixel has at least one adjacent cyan pixel but no adjacent magenta pixels. This pixel has adjacent magenta pixels, so this pixel cannot be labeled "Z". Next, a determination is made whether this pixel has at least one adjacent magenta pixel and no adjacent cyan pixels. This pixel has one adjacent magenta pixel and no adjacent cyan pixels. So, this pixel is labeled "Y". The 3×3 window is then shifted by a single pixel to the right in the top row of the 5×5 window and the same determination is made for the next pixel at the center of the 3×3 window.

In FIG. 5D, the pixel being examined at the center of the 3×3 window is a magenta pixel. A determination is made whether this pixel has at least one adjacent cyan pixel but no adjacent magenta pixels. This pixel has adjacent magenta pixels, so this pixel cannot be labeled "Z". Next, a determination is made whether this pixel has at least one adjacent magenta pixel and no adjacent cyan pixels. This pixel has adjacent cyan pixels, so this pixel cannot be labeled "Y". As such, this particular pixel receives no label. The 3×3 window is shifted by a single pixel to the right along the top row of the 5×5 window. This example continues with respect to FIGS. 6A-D.

Figures 6A, 6B, 6C, 6D:
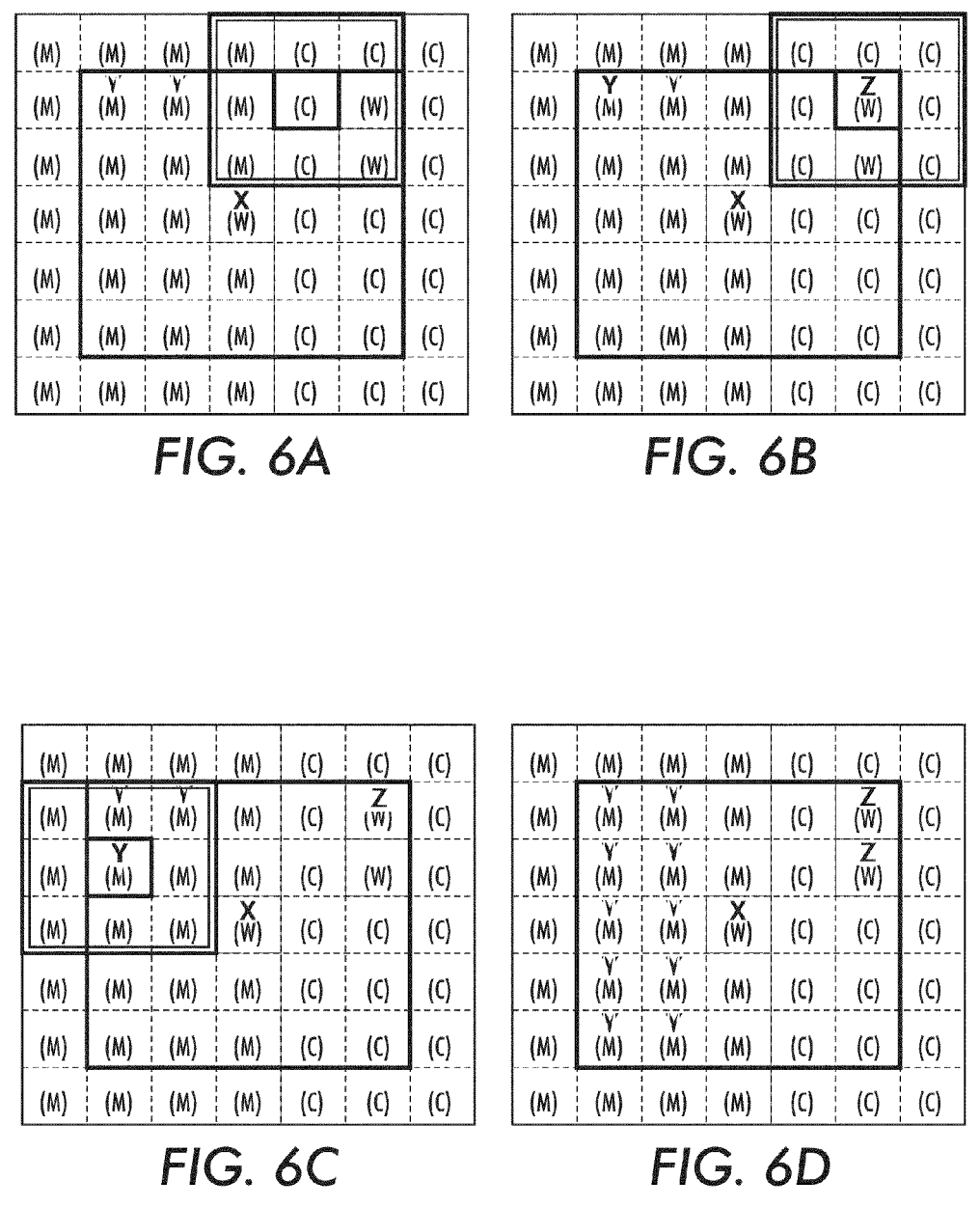

In FIG. 6A, the pixel centered in the current 3×3 window is a cyan (C) pixel. A determination is made whether this pixel has at least one adjacent cyan pixel but no adjacent magenta pixels. This pixel has adjacent magenta pixels, so this pixel cannot be labeled "Z". Next, a determination is made whether this pixel has at least one adjacent magenta pixel and no adjacent cyan pixels. This pixel has adjacent cyan pixels, so this pixel cannot be labeled "Y". As such, this pixel received no label. The 3×3 window is again shifted to the right across the top row of pixels to the upper right corner of the 5×5 window.

In FIG. 6B, the pixel centered in the 3×3 window is a white (W) pixel. A determination is made whether this pixel has at least one adjacent cyan pixel but no adjacent magenta pixels. This pixel has at least one adjacent cyan pixel and does not have any adjacent magenta pixels. Thus, this pixel is labeled "Z". The 3×3 window is shifted to the left-most pixel in the next row of the 5×5 windows and the same determinations are made.

In FIG. 6C, the pixel at the center of the 3×3 window is a magenta (M) pixel. A determination is made whether this pixel has at least one adjacent cyan pixel but no adjacent magenta pixels. This pixel has an adjacent magenta pixel, so this pixel cannot be labeled "Z". Next, a determination is made whether this pixel has at least one adjacent magenta pixel and no adjacent cyan pixels. This pixel has one adjacent magenta pixel and no adjacent cyan pixels. Thus, this pixel is labeled "Y". The 3×3 window is again shifted across each pixel in each row of the 5×5 window. The same determinations, as discussed above, are iterated for each pixel at the center of the 3×3 window. Corresponding labels (or no labels) are assigned accordingly to the above determinations. After examining each of the 25 pixels in the 5×5 window, the end result is shown in FIG. 6D. Pixels which have at least one adjacent magenta pixel and no adjacent cyan pixels have been labeled "Y", and pixels which have at least one adjacent cyan pixel but no adjacent magenta pixels have been labeled "Z". The total number of pixels labeled "Z" are counted and assigned to countC.

In FIG. 6D, countC=5 because there are a total 5 pixels labeled "Z". Next, the total number of pixels labeled "Y" are counted and assigned to countM. In FIG. 6D, countM=10 because there are a total of 10 pixels labeled "Y". Using countC and countM, the candidate pixel will next be qualified as an edge pixel eligible for color trapping.

To qualify the candidate pixel "X" as an edge pixel eligible for color trapping on the magenta (second) side of the cyan-magenta (two-color) edge, the following relationship must be satisfied:

$$(\text{count}C > \text{count}T) \text{ AND } (\text{count}M > \text{count}C) \quad (1)$$

where countT≧2. The variable countT is a user-defined parameter. If countT is too large then it would exclude some of the candidate edge pixels that otherwise would have been qualified. The range should be 0 to 4 for a 5×5 window. A value of 2 is a good value. It should be also appreciated that the variable countT is used because, if we don't use countT and just use the condition (countM>countC) then any pixel in the magenta area would satisfy this condition, even pixels not near the edge.

In the example of FIG. 6D, the candidate pixel "X" is a pixel on the magenta side of the cyan-magenta edge. Thus, Eq. 1 is used to qualify candidate pixel "X". In this instance, countC=5 and countM=10. Substituting these values into Eq. 1, we get: (countC=5>countT=2) AND (countM=10>countC=5). Thus, ((5>2) AND (10>5)). Both conditions of Eq. 1 have been satisfied. Thus, candidate pixel "X" is an edge pixel qualified for trapping on the magenta (second) side of the cyan-magenta (two-color) edge.

Next will be discussed an example of qualifying a candidate pixel as an edge pixel eligible for trapping on the cyan side of the cyan-magenta edge.

Reference is now being made to FIGS. 7A-D which show a 7×7 window of pixels to help explain how one embodiment of the present color trapping method qualifies a pixel on the cyan side of a cyan-magenta edge. Each of the pixels in the 7×7 window has a color value associated therewith. The labels of the colors of the pixels in the window is consistent with the labeling of FIGS. 5 and 6. The candidate pixel is again labeled "X". This window is comprised of an area dominated by cyan and an area dominated by magenta but also contains a small cyan cluster in the dominant magenta area. A few white pixels are also shown. A 3×3 window is again used to define a neighborhood of pixels around a center pixel. The 3×3 window is progressively shifted across the rows of pixels in the 5×5 window. For each pixel at the center of the 3×3 window, a determination is made whether the pixel has at least one adjacent cyan pixel but no adjacent magenta pixels. If so, then the pixel is labeled "Z". Otherwise, a determination is made whether the pixel has at least one adjacent magenta pixel but no adjacent cyan pixels. If so, then the pixel is labeled "Y". Otherwise, the pixel receives no label.

Figures 7A, 7B, 7C, 7D:
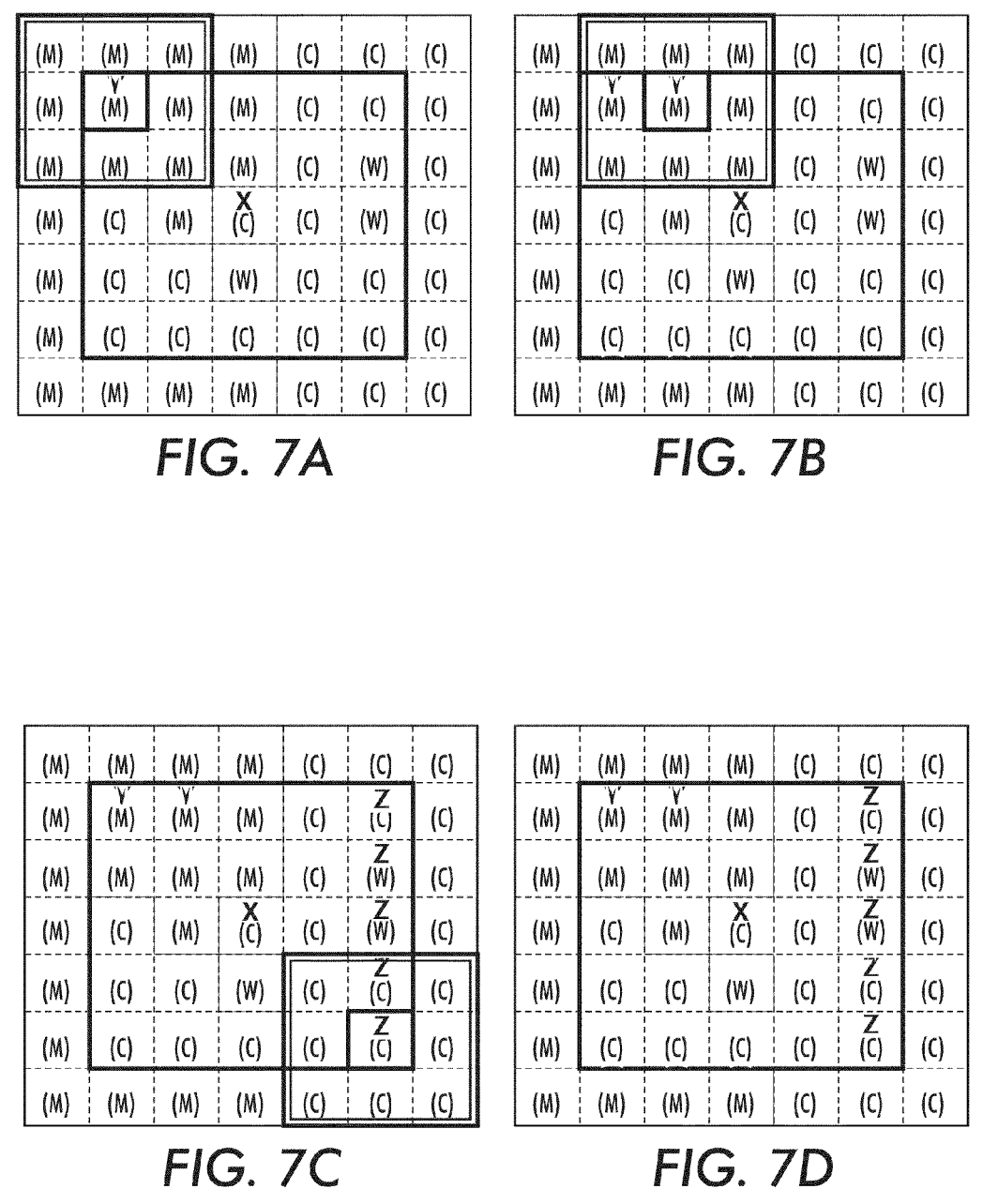

In FIG. 7A, the pixel at the center of the 3×3 window is a magenta (M) pixel. First, a determination is made whether this pixel has at least one adjacent cyan pixel but no adjacent magenta pixels. This pixel has an adjacent magenta pixel so it cannot be labeled "Z". Next, a determination is made whether this pixel has at least one adjacent magenta pixel and no adjacent cyan pixels. This pixel has at least one adjacent magenta pixel and no adjacent cyan pixels. Thus, the pixel is labeled "Y". Thereafter, the 3×3 window is shifted to the right to the next pixel in the top row of the 5×5 window.

In FIG. 7B, the pixel at the center of the 3×3 window is a magenta (M) pixel. This pixel has an adjacent magenta pixels so it cannot be labeled "Z". As with the previously examined pixel (of FIG. 7A), this pixel has at least one adjacent magenta pixel and no adjacent cyan pixels. Thus, the pixel is labeled "Y". The 3×3 window is shifted to the right to the next pixel and the same determinations are iterated for each pixel in the 5×5 window. Corresponding labels (or no labels) are assigned accordingly.

In FIG. 7C, the 3×3 window is shown having been shifted to the right-most pixel in the bottom row of the 5×5 window. For this pixel, a determination is made whether it has at least one adjacent cyan pixel but no adjacent magenta pixels. This pixel has at least one adjacent cyan pixel and no adjacent magenta pixels. Thus, this pixel is labeled "Z". After examining all 25 pixels in the 5×5 window, the end result is shown in FIG. 7D.

Next, the total number of pixels of each label are counted and the values are used to qualify the candidate pixel "X". In FIG. 7D, there are 2 pixels labeled "Y", so countM=2, and there are 5 pixels labeled "Z" so countC=5. Since candidate pixel "X" is on the cyan side of the cyan-magenta edge, Eq. 1 does not apply.

To qualify the candidate pixel "X" as an edge pixel eligible for color trapping on the cyan (first) side of the cyan-magenta (two-color) edge, the following relationship must be satisfied:

$$(\text{countM} > \text{countT}) \text{ AND } (\text{countC} > \text{countM}). \tag{2}$$

where countT=2. In this example, countM=2 and countC=5, i.e., (2>2) AND (5>2). Only one of the conditions has been met. Eq. 2 has not been satisfied. As such, candidate pixel "X" is not an edge pixel qualified for color trapping on the cyan (first) side of a cyan-magenta (two-color) edge. All the other magenta pixels in the 5×5 window of FIG. 7D (not marked "Y") have adjacent cyan neighbor pixels due to the presence of the cluster of cyan located in the dominant magenta area. This makes sense since, when there is a small cyan cluster near an edge of a dominant magenta area, there is no need to add additional cyan in that area. The present method thus ensures that pixels of a cyan cluster located in a magenta dominated area are not incorrectly treated.

Next will be described how to estimate the contone value for the dominant colors on either side of the cyan-magenta edge. For single pixel trapping, magenta can be added to a qualified cyan edge pixel or cyan can be added to a qualified magenta edge pixel, but not both. For two pixel trapping, magenta can be added to a qualified cyan edge pixel and cyan can be added to the qualified magenta edge pixel.

Reference is made to FIG. 8 which shows a plurality of 2×2 estimate windows for a total of 9 windows. The size of an estimate window depends on the resolution. A larger estimate window gives a more accurate color estimate. There should be at least one estimate window located entirely in a dominant cyan area (it does not need to contain all cyan pixels, but needs to be located entirely on the cyan side of the two-color edge) and one estimate window needs to be located entirely within a dominant magenta area. Otherwise, the contone estimates may not be close to a real color value. For each 2×2 estimate window, information about the halftone screens that generated the original bitmap of the color image is used to estimate the contone color value. The largest value of the 9 separate 2×2 estimate windows is used as the final estimated contone color value for the area. Estimates are obtained for both cyan and magenta. These estimates represent the dominant colors on either side of the cyan-magenta two-color edge. If an edge pixel qualified for trapping is on the cyan side of the cyan-magenta edge, the estimated magenta contone value is assigned to it so that a magenta pixel may be added to the cyan edge pixel after re-halftoning the magenta contone value at this pixel location. If an edge pixel qualified for trapping is on the magenta side of the cyan-magenta edge, the estimated cyan contone value is assigned to it so that a cyan pixel may be added to the magenta edge pixel after re-halftoning the cyan contone value at this pixel location. This achieves the purpose of trapping the qualified edge pixels. Estimates for the contone values are obtained as follows.

Assume that the contone value of cyan of the halftoned image is given by C, and that the threshold used to halftone this location in the image is given by $T_c$. Halftoning for cyan would then have been performed according to the following:

If $(C > T_c)$ then cyan is ON.

If $(C \leq T_c)$ then cyan is OFF.

If the contone value of cyan was greater than the halftone threshold then cyan would be turned ON at that pixel location by the halftone screen. If the contone value of cyan is less than or equal to the halftone threshold used to produce cyan at that location then that corresponds to cyan being turned OFF at that pixel location by the halftone screen. Using the 2×2 estimate windows, we can find all cyan pixels (cyan is ON) and obtain the maximum halftone threshold value of the halftone screen that corresponds to an ON pixel at that location, $T_{c1}$. Similarly, we find all the pixels with no cyan (cyan is OFF) and obtain the minimum halftone threshold value of the halftone screen that corresponds to an OFF pixel, $T_{c2}$. Thus, $T_{c1} < C \leq T_{c2}$, provides us with a range of cyan contone values for a given halftone area. When edges are involved, as in the case of trapping, there may be no cyan pixels in the window, as shown in the estimate windows 1, 4, and 7 of FIG. 8. In such cases, only $T_{c1}$ makes sense. So the value of $T_{c1}$ is used as the estimated contone value for cyan. The largest contone value of the 9 cyan 2×2 estimate windows is used as the final estimated contone value for the dominant cyan color in that area. A similar reasoning applies to magenta. This applies to other colors as well. It should be pointed out that, for the sole purposes of obtaining the contone estimates, there is no need to use the 2×2 estimate windows. The 2×2 estimate windows are used to extract information needed by Eq. 3. Instead, for instance, a 7×7 window can be used which is centered around the current pixel and the values for $T_{c1}$ and $T_{c2}$ found in that window.

In order to make sure that only strong cyan-magenta edges get trapped and halftoned areas are not affected much, the following condition is additionally employed:

$$(c\_min < \text{LOW\_COVC}) \| (m\_min < \text{LOW\_COVM}). \tag{3}$$

where LOW_COVC is the low cyan coverage, and LOW_COVM is the low magenta coverage, (these can be set to 50) where LOW_COVC and LOW_COVM are set to 50 by default. And, c_min is set to the minimum of the 9 cyan estimates and m_min is set to the minimum of the 9 magenta estimates. Alternatively, values for c_min and m_min are each set to their respective minimums of the intermediate estimates discussed herein further with respect to FIG. 19.

When a pixel satisfies all the above conditions, it is then halftoned using either the cyan threshold or the magenta threshold corresponding to that pixel location, depending whether it is on the cyan side or magenta side of the edge.

The following is an embodiment that allows multiple pixels to be trapped along each of the X and Y dimensions of the received bitmap. Although the following is focused on cyan-magenta two-color edges, the method applies equally to cyan-yellow, magenta-yellow, or colors bordering black.

Reference is now being made to FIGS. 9A-B which show one example 9×9 window of pixels to help explain how the trapping method qualifies pixels which are one pixel away from a cyan-magenta edge. Pixel colors are consistent with their previous usage. The candidate is the magenta pixel "X". Pixel "X" is one pixel away from the cyan-magenta edge. There is a small cluster of white pixels between the candidate pixel in the dominant cyan area and the vertical cyan-magenta edge. FIG. 9A has a dominant magenta area on the left side of the window and a dominant cyan area on the right side of the window. To achieve this, a single row and a single column immediately adjacent to the candidate pixel "X" are ignored. The ignored rows and columns are shown as shaded regions in FIG. 9B. Pixels in the shaded rows and columns are removed from processing and not considered part of the 5×5 window. Ignoring a single row and column is preferred because it requires the smallest window size for subsequent processing. An alternative would be to skip every other row and column (like sub-sampling the image to a lower resolution), which requires a bigger window size and may miss trapping small edges.

Figures 10A, 10B, 10C:
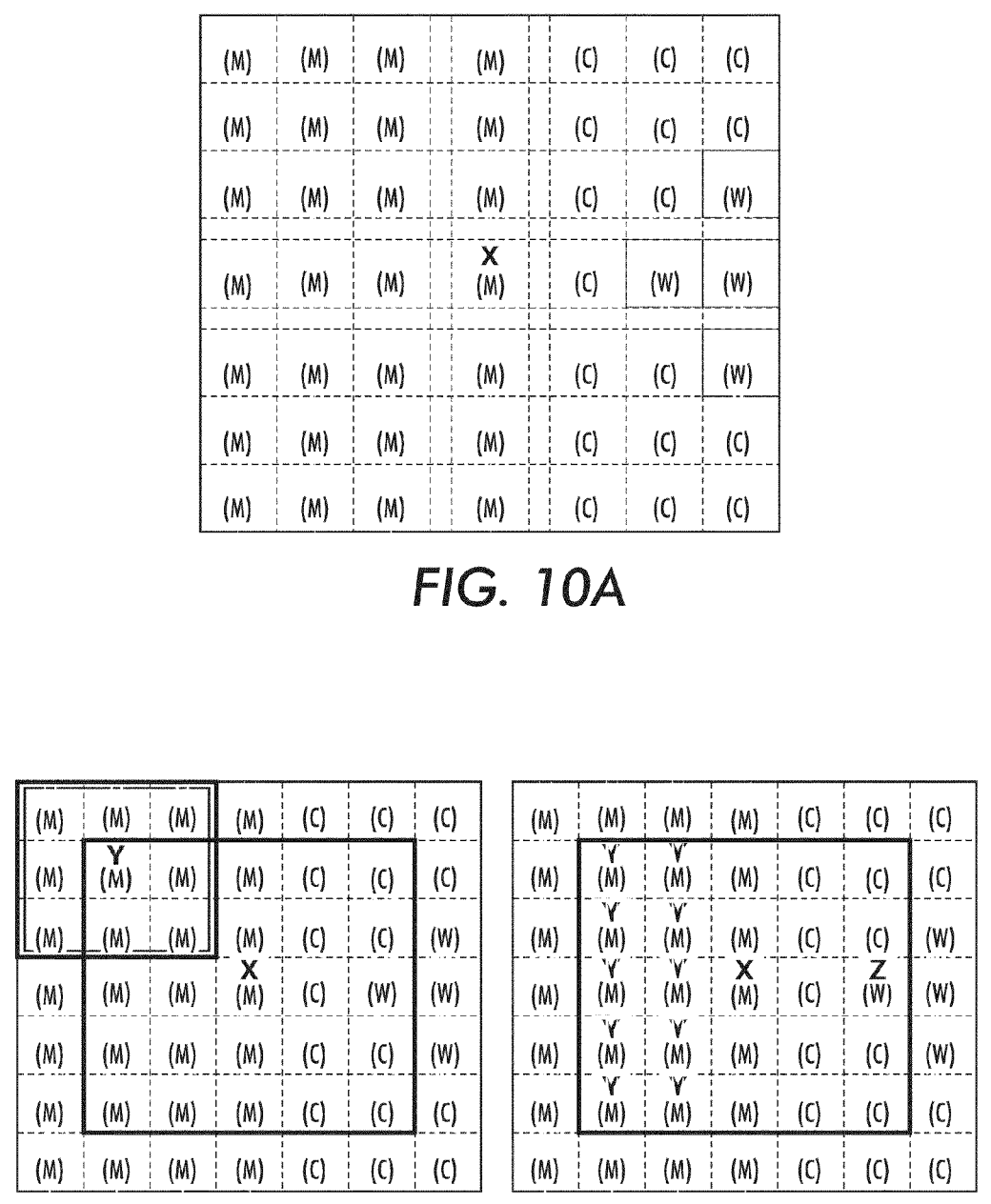

Reference is now made to FIGS. 10A-C which is a continuation of the explanation of FIGS. 9A-B. FIG. 10A shows the window of FIG. 9B with the shaded rows having been collapsed somewhat as explained herein further.

After the rows and columns immediately adjacent the current pixel "X" under consideration have been removed from processing, shown as the shaded rows and columns of FIG. 9B, these are collapsed (FIG. 10A) such that the 5×5 window can be placed around the remaining pixels. The 5×5 window is intended to encompass 25 pixels not including pixels in the shaded areas. FIG. 10B shows the window of FIG. 10A with the shaded rows having been removed from processing. As previously discussed, the 3×3 window is progressively shifted across the rows of pixels such that it gets placed around each pixel in the 5×5 window. For each neighborhood of pixels bounded by the 3×3 window, a determination is made whether the pixel in the center of the 3×3 window has at least one adjacent cyan pixel but not any adjacent magenta pixels. If so, the pixel is marked "Z". Otherwise, a determination is made whether the pixel has at least one adjacent magenta pixel but no adjacent cyan pixels. If so, then the pixel is marked "Y".

In FIG. 10B, the pixel at the center of the 3×3 window is a magenta (M) pixel. This pixel has at least one adjacent magenta pixel and no adjacent cyan pixels. Thus, this pixel is labeled "Y". The 3×3 window is repeatedly shifted across each row of pixels in the 5×5 window. The same determinations are iterated for each pixel. A corresponding label (or no label) is assigned accordingly. After examining each of the 25 pixels in the 5×5 window, the end result of this process having been repeated for all pixels is shown in FIG. 10C. The number of pixels labeled "Z" are counted. In this instance, countC=5. The number of pixels labeled "Y" are counted. In this instance, countM=10. To qualify the candidate pixel as an edge pixel eligible for color trapping on the magenta side of the cyan-magenta edge, the relationship of Eq. 1 must be satisfied. In this example, (countC=5 and countM=10). Substituting these values into Eq. 1, (5>2) AND (10>5). Both conditions are met. Thus, candidate pixel "X" is an edge pixel qualified for color trapping on the magenta side of the cyan-magenta edge. Note that the neighborhood arrangement in FIG. 9A requires a larger cyan/magenta area and, in the case of relatively thin cyan-magenta edges, some qualified edge pixels may be missed. So it would be beneficial to run edge qualification process twice, first using the method described with respect to FIGS. 5 and 6 and then that described with respect to FIGS. 9 and 10 wherein a single row and column are first deleted around the candidate pixel. In another embodiment, alternating rows and columns are deleted around the candidate pixel.

Figure 11:
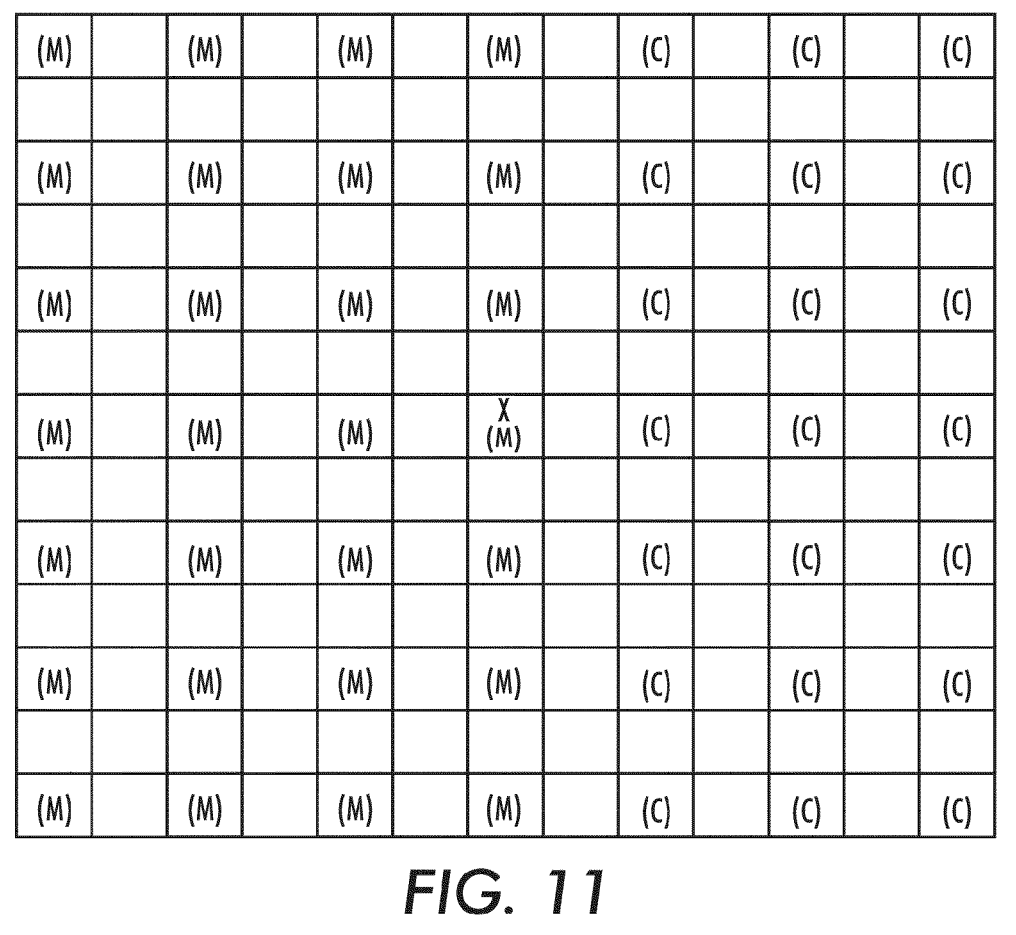

FIG. 11 shows a 13×13 window wherein alternating rows and columns immediately adjacent candidate pixel "X" have been deleted. The deleted rows and columns are removed from processing. This reduces the 13×13 window to a 7×7 window.

What is also provided herein is a method of trapping a different number of pixels in the X and Y dimensions since the above-described color trapping method does not distinguish between X and Y dimensions, i.e., the method does not know if an edge pixel is along the X dimension or Y dimension of the received bitmap. What is also provided herein is a method that doesn't distinguish between horizontally-oriented two-color edges or vertically-oriented two-color edges. A method is needed for trapping a different number of pixels in the X and Y dimensions for those instances wherein printing resolutions in the X and Y dimensions are different. This is also desirable when the amount of misregistration is different along the X and Y axis, or when an engine artifact, such as trailing edge deletion, occurs only along one axis. For example, if the printing resolution is 1200×600 dpi, and we want to trap the equivalent of one 600 dpi pixel in both dimensions, that would require trapping two 1200 dpi pixels (one cyan edge pixel and one magenta edge pixel) in the X dimension, and one 600 dpi pixel (one magenta edge pixel) in the Y dimension. To solve this problem, a 5×3 window is used to obtain countM and a 5×5 window is used to obtain countC, in the same manner as described above, and then countM is scaled upward to match the counts obtained for the 5×5 window. In the instance wherein countM is obtained using a 5×3 windows and countC is obtained using a 5×5 window, countM is multiplied by 5/3. Alternatively, countM is multiplied by 2.

Figures 12A, 12B:
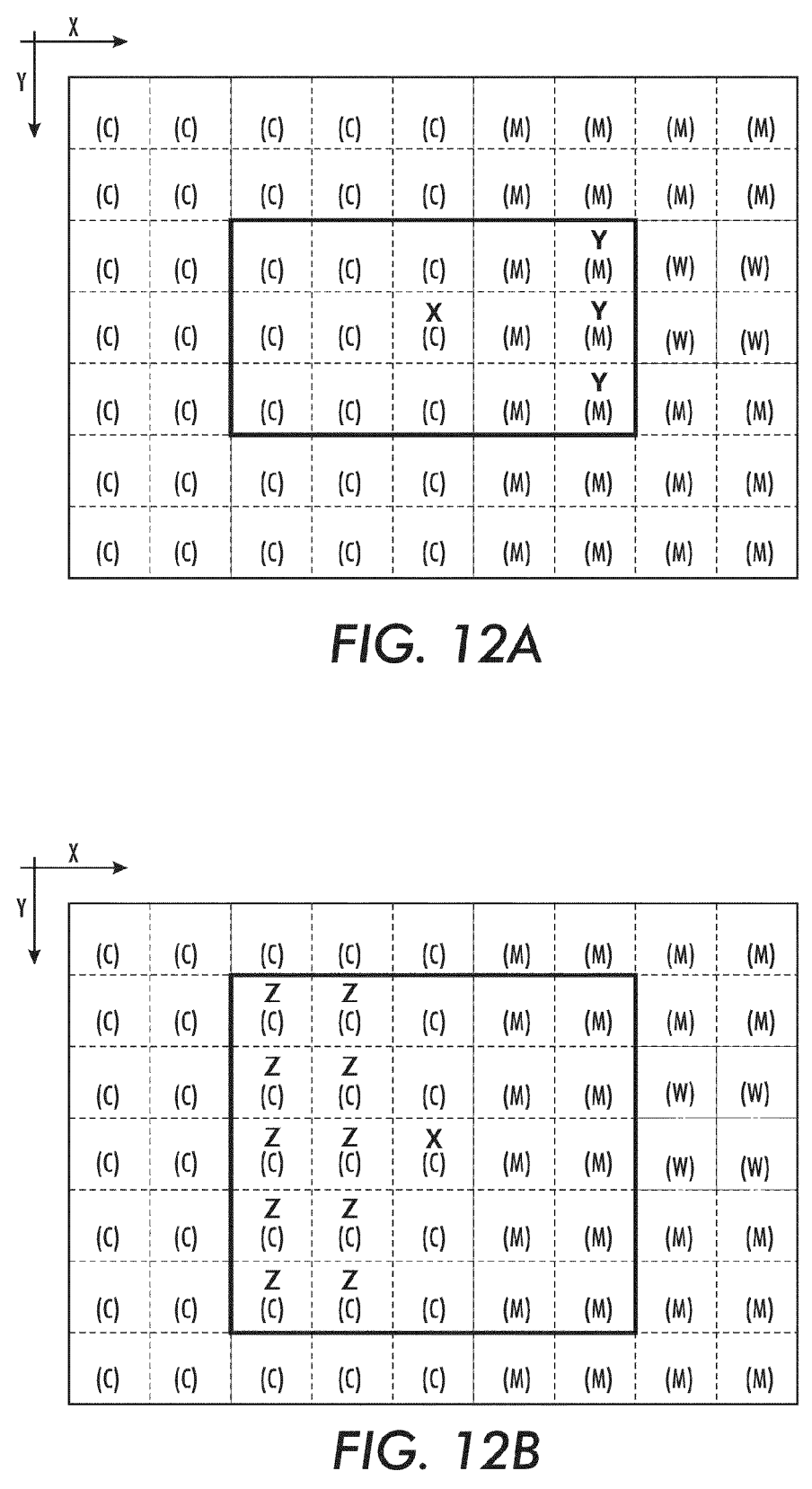

Reference is now made to FIGS. 12A-B showing a candidate cyan pixel "X" being qualified along a vertically-oriented two-color edge. A 5×3 window is centered on pixel "X". As discussed above, a 3×3 window is used to define a neighborhood of adjacent pixels. The 3×3 window is repeated shifted over each pixel (except over the candidate pixel). The above-methodology is applied and pixels are labeled "Z", "Y", or given no label at all. In FIG. 12A, each pixel in the 5×3 window having at least one adjacent magenta pixel but no adjacent cyan pixels is labeled "Y". The total pixels marked "Y" is counted. In FIG. 12A, countM=3. This is then multiplied by 2. Thus, countM=3×2=6. To obtain countC a 5×5 window is used. Pixels in the 5×5 window of FIG. 12B having at least one adjacent cyan pixel but no adjacent magenta pixels are labeled "Z". The total number of "Z" pixels are counted. In FIG. 12B, countC=10. To qualify a cyan pixel "X" as an edge pixel eligible for color trapping on the cyan side of the cyan-magenta edge, the relationship of Eq. 2 must be satisfied. In this instance, (countM=6>countT=2) AND (countC=10>countM=6). The relationship is satisfied. Thus, the candidate cyan pixel "X" is a qualified edge pixel for color trapping on the cyan side of the cyan-magenta edge.

Figures 13A, 13B:
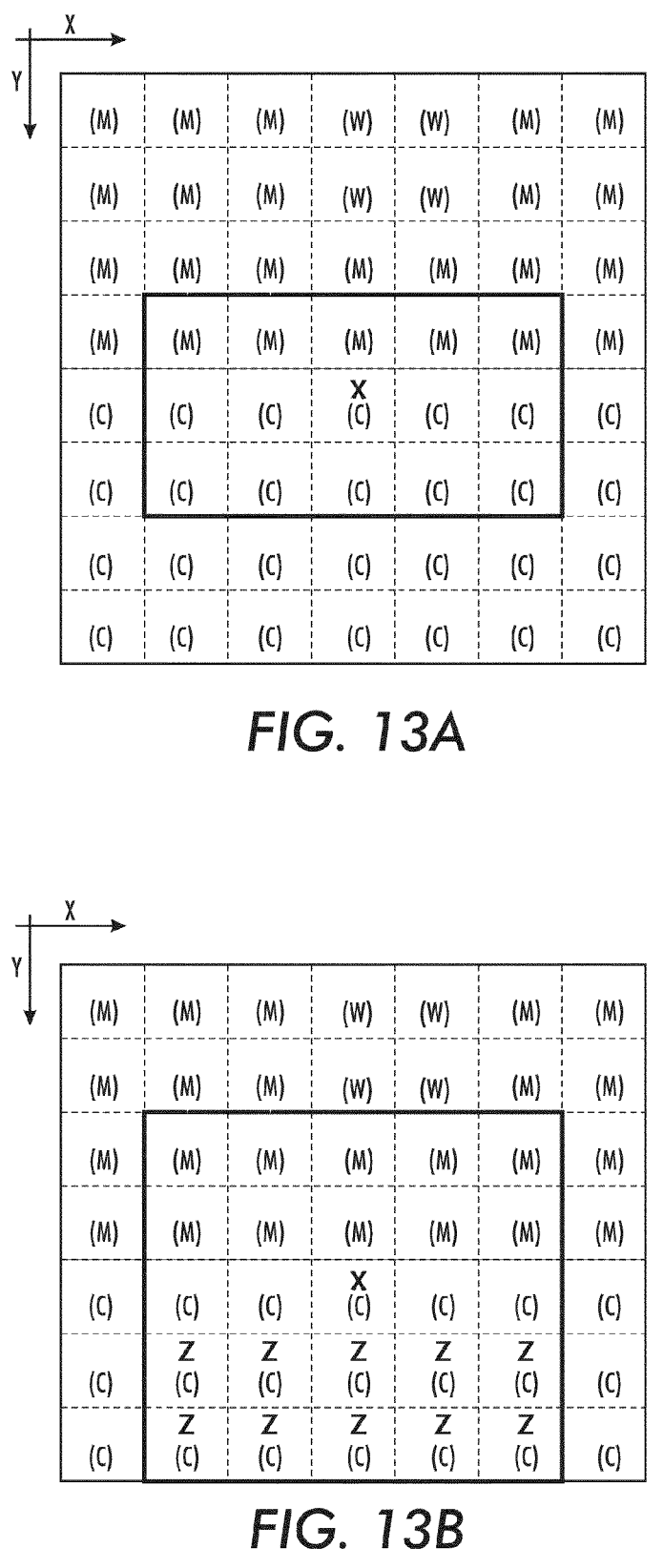

In FIG. 13A, along a horizontal two-color edge, a 5×3 window is used to obtain countM. There are no pixels with at least one adjacent magenta pixel and no adjacent cyan pixels. All the pixels with adjacent magenta pixels have at least one adjacent cyan pixel. So countM=0. Thus, there are no pixels labeled "Y" in FIG. 13A. In FIG. 13B, a 5×5 window is used to obtain countC. There are 10 pixels which have at least one adjacent cyan pixel but no adjacent magenta pixels. These are labeled "Z". To qualify a cyan pixel "X" as an edge pixel eligible for color trapping on the cyan side of the cyan-magenta edge, the relationship of Eq. 2 must be satisfied. In this instance, (countM=0>countT=2) AND (countC=10>countM=0). The relationship is not satisfied. Thus, the candidate cyan pixel "X" is not a qualified edge pixel for trapping on the cyan side of the cyan-magenta edge. Cyan pixel "X" in the window of FIG. 13 is excluded for trapping. As shown, the use of a 5×3 window, in one instance, allowed for trapping of as candidate cyan pixel along a vertical edge (FIGS. 12A-B) but disallowed trapping of the same cyan pixel along a horizontal edge (FIGS. 13A-B).

Next will be demonstrated how one cyan pixel and one magenta pixel will be trapped in the X dimension (vertical edge).

Figure 14A:
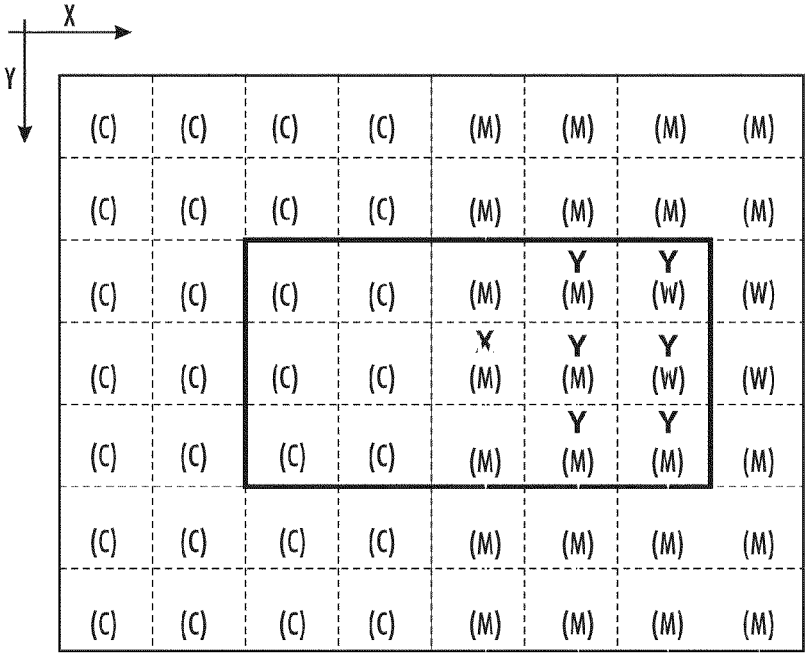
FIGS. 14A-B illustrate another embodiment of color trapping.
Figure 14B:
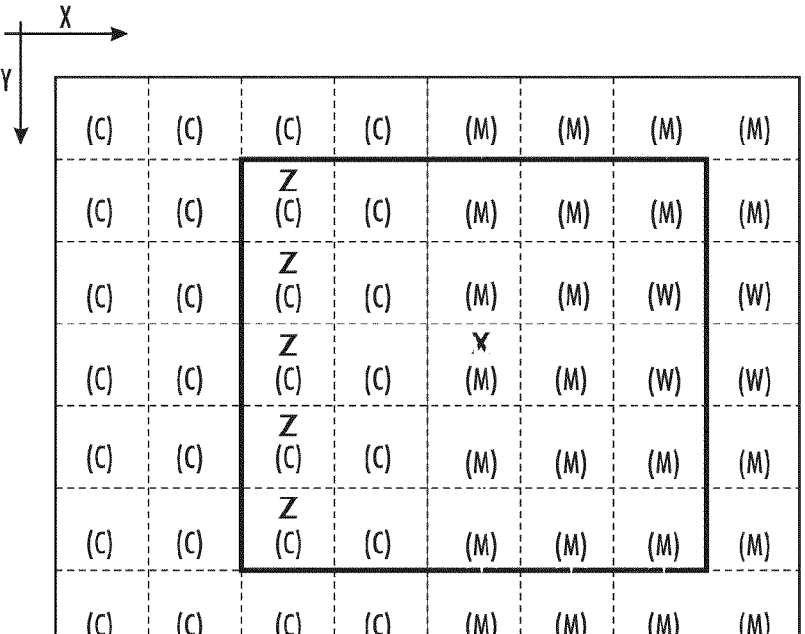

Reference is now being made to FIG. 14A. A 5×3 window is centered about a candidate magenta pixel "X". There are a total of 6 pixels with at least one adjacent magenta pixel and no adjacent cyan pixels (labeled "Y"). There are a total of 6 pixels labeled "Y". Thus, countM=6. When multiplied by 2, countM=6×2=12. A 5×5 window is used for the determination of countC, as shown in FIG. 14B. Pixels with at least one adjacent cyan pixel and no adjacent magenta pixels are labeled "Z". Thus, countC=5. To qualify the candidate pixel "X" as an edge pixel for color trapping on the magenta side of the cyan-magenta edge, (countC=5>countT=2) AND (countM=12>countC=5). Eq. 1 is satisfied. Thus, the candidate pixel is an edge pixel qualified for trapping on the magenta side of the cyan-magenta edge. FIG. 12A-B demonstrated that the candidate pixel "X" was a qualified edge pixel on the cyan side of the cyan-magenta edge. Therefore, one cyan pixel and one magenta pixel were trapped in the X dimension (vertical edge).

Now, it will be shown that a magenta edge pixel is qualified for trapping and a cyan edge pixel is not qualified for trapping in the Y dimension (horizontal edge).

As was shown in FIG. 13, cyan edge pixel "X" was not a qualified edge pixel for trapping on the cyan side of the cyan-magenta edge (horizontal edge).

Figure 15A:
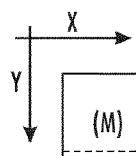
FIGS. 15A-B illustrate another embodiment of color trapping.
Figure 15B:
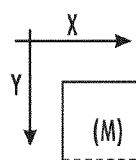

In FIGS. 15A-B, a 5×3 window is centered about a candidate pixel "X" on the magenta side of the cyan-magenta edge. There are 5 pixels with at least one adjacent magenta pixel and no adjacent cyan pixels. Thus, 5 pixels in FIG. 15A are labeled "Y". So, countM=5. When multiplied by 2, countM=5×2=10. Next, a 5×5 window is used for the determination of countC. In FIG. 15B, pixels with at least one adjacent cyan pixel and no adjacent magenta pixels are labeled "Z". There are 5 pixels with at least one adjacent cyan pixel and no adjacent magenta pixels. To qualify the candidate pixel "X" as an edge pixel for trapping on the magenta side of the cyan-magenta edge, Eq. 1 must be satisfied. In this instance, (countC=5>countT=2) AND (countM=10>countC=5), thus this magenta edge pixel is qualified for trapping.

The following sums up the different scenarios for selecting the window to use for obtaining countM (a 5×5 window is always used to obtain countC):

When trapping an even number of pixels in both the X and Y dimensions: use a 5×5 window.

When trapping an odd number of pixels in both the X and Y dimensions: use a 5×5 window, but trap only the magenta edge pixel and do not trap the cyan edge pixel.

When trapping an even number of pixels in the X dimension and an odd number of pixels in the Y dimension: use a 5×3 window.

When trapping an odd number of pixels in the X dimension and an even number of pixels in the Y dimension: use a 3×5 window.

The candidate pixels, discussed with respect to the flow diagrams above, are selected from a set of pixels already determined to reside along a two color edge. Next will be discussed an embodiment which utilizes orientation directions and max/min counts to determine whether a given pixel resides along a two-color edge in a bi-level bitmap.

Figure 16:
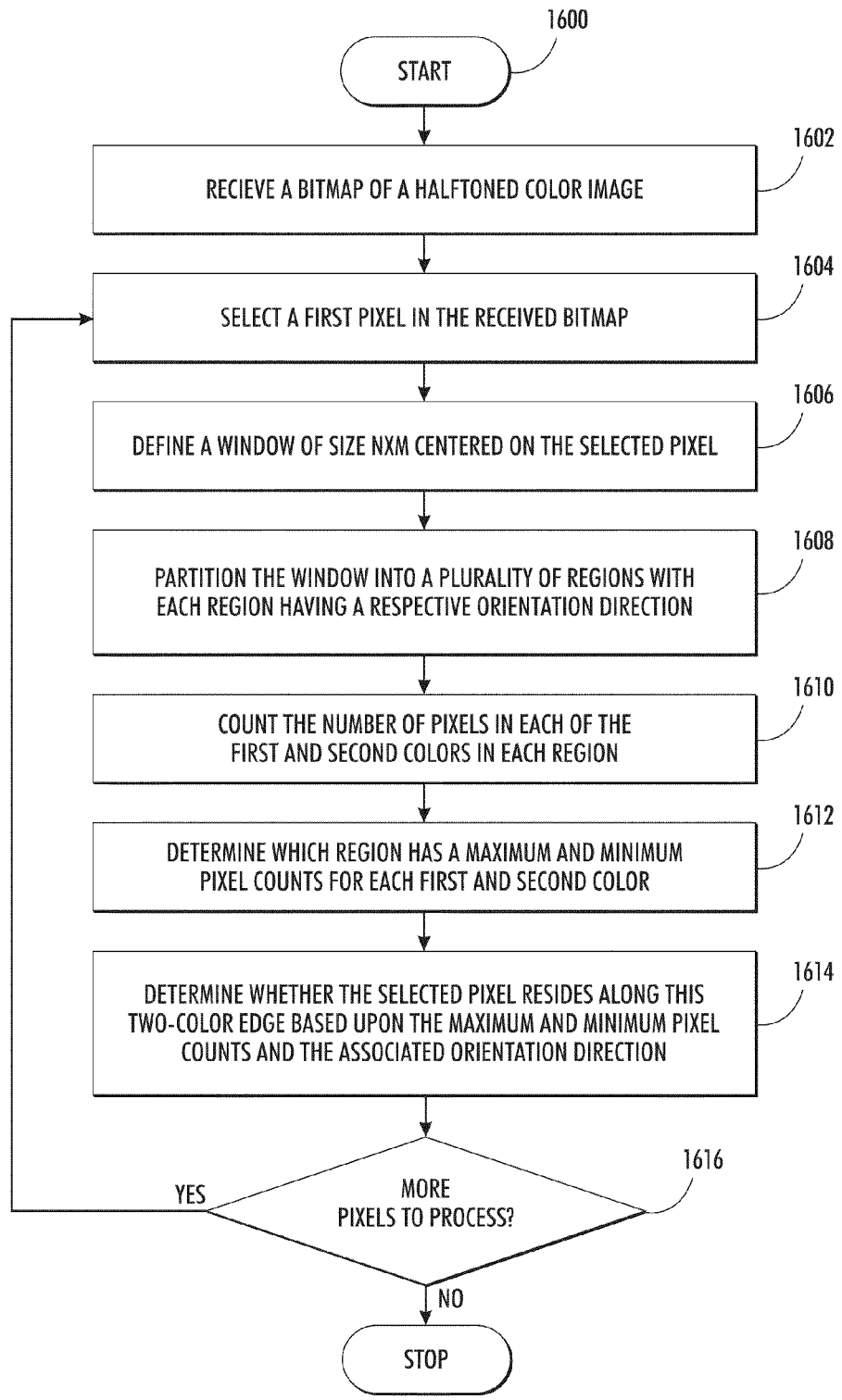
FIG. 16 is a flow diagram of another embodiment of the present color trapping method which utilizes orientation directions and max/min counts to determine whether a pixel resides along a two-color edge in a halftoned bi-level bitmap.

Reference is next being made to the flow diagram of FIG. 16 which illustrates another embodiment of the present method which utilizes orientation directions and max/min counts to determine whether a pixel resides along a two-color edge in a bi-level bitmap of a halftoned color image. Flow processing starts at 1600 and immediately proceeds to 1602.

At step 1602, receive a bitmap of a halftoned color image having a plurality of pixels from an image input device. The bitmap may be retrieved from a memory or a storage device or otherwise obtained from a scanning device capable of converting a color image into a plurality of digital pixels each having at least one color value. The bitmap may be retrieved from a remote device over a network such as the Internet, or a LAN. The following steps are iteratively performed for each of a pre-defined number of pixels in the received bitmap.

At step 1604, a first pixel in the bitmap is selected. The pixel may be selected manually by a user or otherwise identified. The pixel may be a first pixel in any region of the image or may be a first pixel in a user-defined region within the bitmap whereon various aspects of the present method are intended to be performed.

At step 1606, a window, of size n×m, is centered on the pixel which was selected in the previous step. In one embodiment n=m=7. As such, a 7×7 window is centered on the previously selected pixel. In another embodiment, n=m=3, thereby defining a 3×3 window centered on the previously selected pixel. In yet another embodiment, n≠m, i.e., n=3 and m=5, thereby defining a 3×5 window. The window has a row/column format as shown by way of example in FIG. 18.

At step 1608, the window is partitioned into a plurality of regions with each region having a respective orientation direction. Each orientation direction has an associated numeric value. As will be discussed herein further, DIR_N which corresponds to the north region, has the associated value of 1. DIR_NW which corresponds to the northwest region, has the associated value of 8. There are at least 8 orientation directions corresponding respectively to the compass point directions.

At step 1610, the number of pixels of each of the first and second colors in each of the partitioned plurality of regions are counted. As will be discussed herein further, the cyan counts are assigned to a corresponding temporary variable such as, nC, neC, eC, seC, sC, swC, wC, nwC.

At step 1612, identify which region of the plurality of regions partitioned in step 1608 has a maximum and a minimum pixel counts for each of the first and second colors of the previous step.

At step 1614, a determination is made whether the current pixel resides along the two-color edge based upon the maximum and minimum pixel counts and the orientation direction associated with the maximum and minimum pixel counts. An example embodiment for determining the maximum and minimum pixel counts and the orientation directions associated with each of the maximum and minimum pixel counts is discussed herein further with respect to FIGS. 17-18.

At step 1616, a determination is made whether any more pixels in the bitmap remain to be processed. If so, then processing repeats with respect to step 1604 wherein a next pixel is processed accordingly. Thereafter, processing ends.

In various above-described embodiments, thresholds were used to identify cyan-magenta edges. However, hard thresholds may cause artifacts such as a discontinuity along a cyan-magenta sweep, which results from applying no trapping below the specified threshold and applying trapping above the specified threshold. The following is a cyan-magenta edge detection method that can correctly identify cyan-magenta edges. With the following embodiment, thresholds are not needed.

Reference is next being made to FIG. 17. Let $R_x$ indicate row index and let $C_x$ indicate column index, where x is in the range from 0 to 6. Each of the pixels in the 7×7 window of FIG. 17 has a row/column index associated with it. For example, the magenta (M) pixel in the upper left corner of the 7×7 window has row/column index $R_0C_0$. The top row going across from left to right is row $R_0$. In the lower right hand corner of the 7×7 window is a white (W) pixel having the row/column index of $R_6C_6$. The 7×7 window is comprised of 7 rows (0 to 6) and 7 columns (0 to 6). The row/column format is used to understand the compass directions of the embodiment discussed with respect to FIGS. 18A-D.

Attention is now being directed to FIGS. 18A-D. The 7×7 window of FIG. 17 has been divided into a plurality of regions based upon a given region's respective compass orientation direction. Each of 8 different compass directions is assigned a numeric value as follows:

define DIR_N=1, where ($R_x<3$)
define DIR_NE=2, where ($C_x>R_x$)
define DIR_E=3, where ($C_x>3$)
define DIR_SE=4, where ($R_x+C_x>6$)
define DIR_S=5, where ($R_x>3$)
define DIR_SW=6, where ($C_x<R_x$)
define DIR_W=7, where ($C_x<3$)
define DIR_NW=8, where ($R_x+C_x<6$)

As shown in FIG. 18A, the 7×7 window is divided into a top region and a bottom region separated by a region of shaded pixels. The top region is north region 1802. Pixels residing in north region 1802 are considered north pixels. North pixels have an orientation direction of DIR_N=1. The bottom region is south region 1803. Pixels residing in south region 1803 are considered south pixels. South pixels have an orientation direction of DIR_S=5.

In FIG. 18B, the 7×7 window has been divided into a left region and a right region separated by a region of shaded pixels. Pixels residing in west region 1804 have an orientation direction of DIR_W=7. Pixels residing in east region 1805 have an orientation direction of DIR_E=3.

In FIG. 18C, the 7×7 window has been divided into northwest and southeast regions separated by a diagonal of shaded pixels having row/column indices running from $R_6C_0$ to $R_0C_6$. Pixels residing in northwest region 1806 (above the diagonal) have an orientation direction of DIR_NW=8. Pixels residing in southeast region 1807 (below the diagonal) have an orientation direction of DIR_SE=4.

In FIG. 18D, the 7×7 windows has been divided into southwest and northeast regions separated by a diagonal of shaded pixels having row/column indices running from $R_0C_0$ to $R_6C_6$. Pixels residing in southwest region 1808 have an orientation direction of DIR_SW=6. Pixels residing in northeast region 1809 have an orientation direction of DIR_NE=2.

Once the 7×7 window has been partitioned into regions and the orientation directions understood, the algorithm proceeds as follows.

Count the cyan pixels in each of the 8 compass regions and assign the counts to each variable: nC, neC, eC, seC, sC, swC, wC, nwC, respectively, wherein:

nC is the number of cyan pixels in DIR_N.
sC is the number of cyan pixels in DIR_S.
wC is the number of cyan pixels in DIR_W.
eC is the number of cyan pixels in DIR_E.
nwC is the number of cyan pixels in DIR_NW.
seC is the number of cyan pixels in DIR_SE.
swC is the number of cyan pixels in DIR_SW.
neC is the number of cyan pixels in DIR_NE.

Values are assigned similarly to counts of magenta pixels in each region.

With reference still being made to FIGS. 18A-D, the number of north cyan pixels, i.e., cyan pixels in north region 1802 of FIG. 18A, is 11. Thus, nC=11. The number of magenta pixels in north region 1802 is 3. Thus, nM=3. The number of cyan pixels in the south region 1803 is 8. Thus, sC=8. The number of magenta pixels in the south region 1803 is 5. Thus, sM=5. In a similar fashion, the number of cyan pixels in west region 1804 of FIG. 18B is 10. Thus, wC=10. The number of magenta pixels in west region 1804 is 10. Thus, wM=10. The number of cyan pixels in east region 1805 of FIG. 18B is 4. Thus, eC=4. The number of magenta pixels in east region 1805 is 0. Thus, eM=0. The number of cyan pixels in northwest region 1806 of FIG. 18C is 12. Thus, nwC=12. The number of magenta pixels in northwest region 1806 is 7. Thus, nwM=7. The number of cyan pixels in southeast region 1807 of FIG. 18D is 7. Thus, seC=7. The number of magenta pixels in the southeast region 1807 is 1. Thus, seM=1. Likewise, the number of cyan pixels in the southwest region 1808 is 10. Thus, swC=10. The number of magenta pixels in the southwest region 1808 is 9. Thus, swM=9. The number of cyan pixels in northeast region 1809 is 8. Thus, neC=8. The number of magenta pixels in northeast region 1809 is 0. Thus, neM=0.

Next, the maximum cyan count is determined. In one embodiment, the maximum pixel count for cyan is determined as follows:

$$\text{maxcnt}C=\text{MAX}(nC,neC,eC,seC,sC,swC,wC,nwC).$$

In this case, the maximum cyan count is 12 (nwC=12).

Similarly the maximum magenta count is determined. In one embodiment, the maximum pixel count for magenta is determined as follows:

$$\text{maxcnt}M=\text{MAX}(nM,neM,eM,seM,sM,swM,wM,nwM).$$

In this case, the maximum magenta count is 10 (wM=10).

Next, find the geographic value associated with each maximum count for cyan and magenta. For cyan, the orientation direction associated with nwC is DIR_NW=8. Thus, edge_dirC=DIR_NW=8. For magenta, the orientation direction associated with wM is DIR_W=7. Thus, edge_dirM=DIR_W=7.

Next, find the minimum cyan count value as follows:

$$\text{mincnt}C=\text{MIN}(nC,neC,eC,seC,sC,swC,wC,nwC).$$

In this case, the minimum cyan count is 4 (eC=4).
Find the minimum magenta count value as follows:

$$\text{mincnt}M=\text{MIN}(nM,neM,eM,seM,sM,swM,wM,nwM).$$

In this case, the minimum magenta count is 0 (neM=0).

Next, find the geographic value associated with each minimum count for cyan and magenta. For cyan, the orientation direction associated with eC is DIR_E. Thus, Edge_dirC2=DIR_E=3. For magenta, the orientation direction associated with neM is DIR_NE. Thus, edge_dirM2=DIR_NE=2.

Calculate a first variable 'diff' along the edge, as follows:

$$\text{diff}=\text{edge\_dir}C-\text{edge\_dir}M;$$

$$\text{if (diff}<0) \text{ diff}=-\text{diff};$$

$$\text{if (diff}>4) \text{ diff}=8-\text{diff};$$

In this instance, edge_dirC=8 and edge_dirM=7. Thus, diff=(8−7)=1. If (1<0) then reverse the sign of diff. Here, diff=+1 so we do not reverse the sign. If (1>4) then diff=8−diff. Here, 1 is not greater than 4 so we do nothing.

Similarly, calculate a second variable 'diff2' along the edge, as follows:

diff2=edge_dirC2−edge_dirM2;

if (diff2<0) diff2=−diff2;

if (diff2>4) diff2=8−diff2;

In this instance, edge_dirC2=3 and edge_dirM2=2. Thus, diff2=(3−2)=1.

Once values for diff and diff2 have been obtained, the following is determined.

If ((maxcntC>HIGHCNTC)&&
 (maxcntM>HIGHCNTM)&&(diff≧3)&&
 (mincntC<LOWCNTC)&&
 (mincntM<LOWCNTM)&&(diff2≧3)), then the
 current pixel is along a cyan-magenta edge, where HIGHCNTC and HIGHCNTM are set to 8, and LOWCNTC and LOWCNTM are set to 3. If we plug in each of the associated values we get: ((12>8) && (10>8) && (1≧3) && (4<3) && (0<3) && (1>=3)). If this relationship evaluates to TRUE then the current pixel is along a cyan-magenta edge. However, the test evaluates to FALSE, i.e., the test fails. Thus, the pixel "X" is not along a cyan-magenta edge.

In the embodiments described above with respect to Eq. 3, c_min is the minimum of the 9 cyan estimates and m_min is the minimum of the 9 magenta estimate. One potential problem is that one of the estimates may fall in a white area between the halftone dots and may result in a very low coverage estimate, which can be very different than the real coverage. In this embodiment, a 5×5 window of intermediate estimates is calculated. This embodiment will next be discussed with respect to FIGS. 19-20.

Reference is now made to FIGS. 19A-C.

The 10×10 window of FIG. 19A is divided into a plurality of 2×2 coverage estimate windows. Each of the 2×2 estimate windows of FIG. 19A is shown in FIG. 19B and labeled as E11, E12, etc. Each of the estimate windows of FIG. 19B has a corresponding intermediate estimate, as shown in FIG. 19C. The value of each intermediate estimate window is based upon the estimates of its neighbors. For example, intermediate estimate window F22 is based upon the estimate of window E22 and its four neighbors. The four neighbors of estimate window E22 are: Left=E21, Right=E23, Up=E12, and Down=E32. Some don't have four neighbors, for example E11. In that case, set the non-existing neighbors to 255. For E11, set Left=255 and Up=255. The above definition for the four neighbors should work for most halftones. If a horizontal or vertical line screen is used for either cyan or magenta, instead of using E21, E23, E12, E32, it would be better to use E11, E13, E31, E33.

Intermediate estimate F22 is determined as follows:

F22=max(E22,min(Left,Right,Up,Down)).

In this case, F22=max(E22, min(E21, E23, E12, E32)). The variables c_min and m_min, discussed previously with respect to Eq. 4, are each set to their respective minimums of the intermediate estimates.

Figure 20:
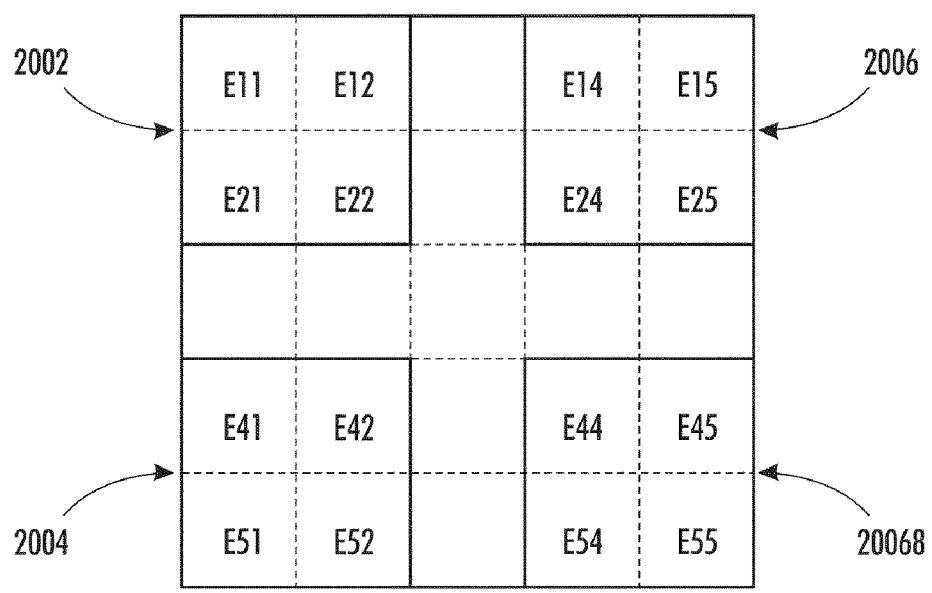
FIG. 20 shows the estimate window of FIG. 19B having been subdivided into a 4 equal-sized quadrants.

Reference is now being made to FIG. 20 wherein the estimate windows of FIG. 19B are shown having been subdivided into four equal-sized quadrants. The quadrant in the upper left hand corner (at 2002) is quadrant 1. The quadrant in the lower left corner (at 2004) is quadrant 3. The quadrant in the upper right hand corner (at 2006) is quadrant 2. The quadrant in the lower right hand corner (at 2008) is quadrant 4. Then, initialize each of: quad1=1; quad2=1; quad3=1; and quad4=1. Set the user-defined variables VERY_LOW_C and VERY_LOW_M to 25 (out of 255) by default. A 2×2 window is used along with information about the halftone screens that generated the original bitmap of the color image to estimate the contone color coverage for a given area. Window size depends on the resolution. A 2×2 window may be used for a halftone screen resolution of 600×600.

Proceed to determine values for each of: quad1, quad2, quad3, and quad4 according to the following algorithm where Exx_C is the cyan coverage estimate for that estimate window, and Exx_M is the magenta coverage estimate for that estimate window. For example, E11_C is the E11 estimate for cyan, and E11_M is the E11 estimate for magenta. For each quadrant i=1.4, if ((Exx_C>VERY_LOW_C)∥ (Exx_M>VERY_LOW_M)) quad(i)=0. Flag_low_cm= (quad1∥quad2∥quad3∥quad4), where "∥" is a logical OR operation. When flag_low_cm=1, indicating that a white border exists near the cyan-magenta edge, do not trap candidate pixel "X".

Some or all of any of the above-described embodiments can be implemented by special purpose computer system. Such a special purpose system is capable of executing machine readable program instructions for carrying out one or various aspects of the present method and may comprise any of a micro-processor or micro-controller, ASIC, electronic circuit, or special purpose processor. Such a system could be implemented as a separate system, controller, circuit, FPGA, and the like. Such a system may be integrated, in whole or in part, with a xerographic system, color management system, or image processing system. All or portions of the flow diagrams hereof may be implemented partially or fully in hardware in conjunction with machine executable instructions in communication with various components of such a system. One example special purpose system is described next with respect to the embodiment of FIG. 20.

Example Special Purpose Computer

Figure 21:
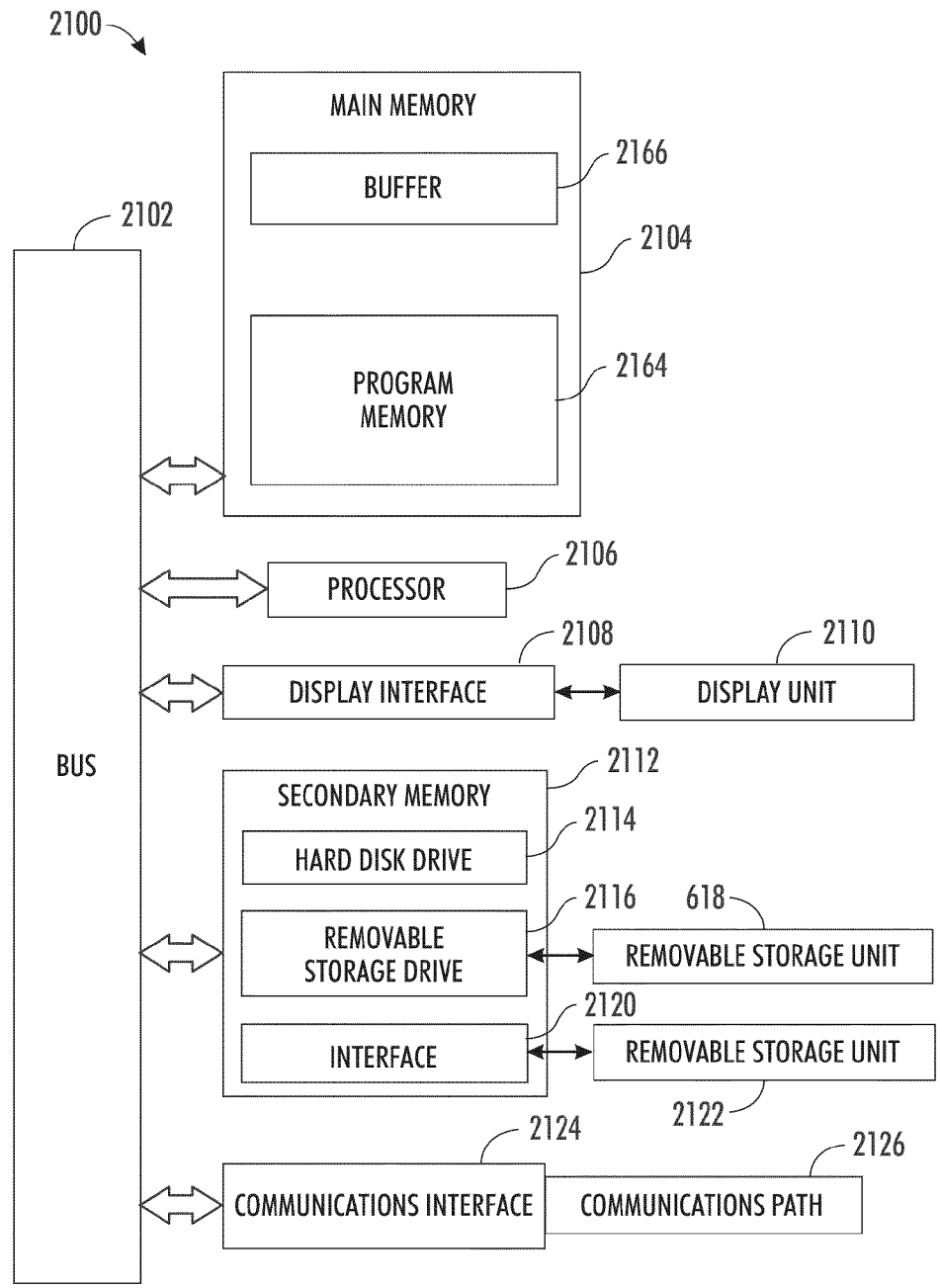
FIG. 21 illustrates a block diagram of one example embodiment of a special purpose computer system for performing one or more aspects of the present color trapping method.

Reference is now being made to FIG. 21 which illustrates a block diagram of one example embodiment of a special purpose computer system for performing one or more aspects of the present method.

Special purpose computer system 2100 includes processor 2106 for executing machine executable program instructions for carrying out all or some of the present method. The processor is in communication with bus 2102. The system includes main memory 2104 for storing machine readable instructions. Main memory may comprise random access memory (RAM) to support reprogramming and flexible data storage. Buffer 2166 stores data addressable by the processor. Program memory 2164 stores machine readable instructions for performing the present method. A display interface 2108 forwards data from bus 2102 to display 2110. Secondary memory 2112 includes a hard disk 2114 and storage device 2116 capable of reading/writing to removable storage unit 2118, such as a floppy disk, magnetic tape, optical disk, etc. Secondary memory 2112 may further include other mechanisms for allowing programs and/or machine executable instructions to be loaded onto the processor. Such mechanisms may include, for example, a storage unit 2122 adapted to exchange data through interface 2120 which enables the transfer of software and data. The system includes a communications interface 2124 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 2126 which carries such signals and may be implemented using wire, cable, fiber optic, phone line, cellular link, RF, memory, or other means known in the arts.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

It should be understood that the flow diagrams presented herein are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device that is readable by a compatible machine architecture, xerographic system, color management or other image processing system, any of which are capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for determining whether a color pixel resides along a two-color edge in a bi-level bitmap of a halftoned color image, the method comprising:

receiving a bitmap of a halftoned color image having a plurality of pixels;

defining a window of size n×m centered on a current pixel in the bitmap;

partitioning the window into a plurality of regions, with each region having an orientation direction with each orientation direction having an associated numeric value;

counting a number of pixels of each of the first and second colors in each of the plurality of regions;

determine which region has a maximum and minimum pixel count for each of the first and second colors; and using the maximum and minimum pixel counts and each of the associated orientation directions to determine whether the current pixel resides along a two-color edge in the bitmap.

2. The method of claim 1, wherein the defined m×n window has a row/column format given by $R_x$, $C_x$, and the plurality of regions comprises: DIR_N=1, where ($R_x$<3), DIR_NE=2, where ($C_x$>$R_x$), DIR_E=3, where ($C_x$>3), DIR_SE=4, where ($R_x$+$C_x$>6), DIR_S=5, where ($R_x$>3), DIR_SW=6, where ($C_x$<$R_x$), DIR_W=7, where ($C_x$<3), and DIR_NW=8, where ($R_x$+$C_x$<6).

3. The method of claim 1, further comprising:

deleting at least one row of pixels immediately adjacent to the pixel;

deleting at least one column of pixels immediately adjacent to the pixel; and defining the window of size n×m centered on the current pixel which does not include any pixels in each of the deleted rows and columns.

4. The method of claim 3, further comprising:

assigning the contone color value estimated for the color on an opposing side of the two-color edge to the pixel; and re-halftoning the current pixel using the assigned contone color value.

5. The method of claim 1, wherein in response to the current pixel residing along the two-color edge in the bitmap, further comprising estimating contone color values for the first and second colors of the two-color edge based upon halftone threshold values of the halftone screens used to color the area of the bitmap wherein the current pixel resides.

6. The method of claim 1, further comprising:

subdividing the window into a plurality of estimate windows and corresponding intermediate estimate windows; and determining values for each of the intermediate estimate windows based upon contone color values of a corresponding estimate window and estimate windows which are immediately adjacent to that estimate window.

7. The method of claim 6, further comprising:

setting c_min and m_min to their respective minimum values of the intermediate estimate windows;

determining the condition given by:

($c$_min<LOW_COVC)||($m$_min<LOW_COVM), where LOW_COVC is the low cyan coverage, and LOW_COVM is the low magenta coverage; and trapping the pixel in response to the condition having been satisfied.

8. A system for determining whether a color pixel resides along a two-color edge in a bi-level bitmap of a halftoned color image, the system comprising:
   a memory;
   a storage medium; and
   a processor in communication with the memory and the storage medium, the processor executing machine readable instructions for performing for each of a number of pixels in the bitmap:
      receiving a bitmap of a halftoned color image having a plurality of pixels;
      defining a window of size n×m centered on a current pixel in the bitmap;
      partitioning the window into a plurality of regions, with each region having an orientation direction with each orientation direction having an associated numeric value;
      counting a number of pixels of each of the first and second colors in each of the plurality of regions;
      determine which region has a maximum and minimum pixel count for each of the first and second colors; and
      using the maximum and minimum pixel counts and each of the associated orientation directions to determine whether the current pixel resides along a two-color edge in the bitmap.

9. The system of claim 8, wherein the defined m×n window has a row/column format given by $R_x$, $C_x$, and the plurality of regions comprises: DIR_N=1, where ($R_x$<3), DIR_NE=2, where ($C_x$>$R_x$), DIR_E=3, where ($C_x$>3), DIR_SE=4, where ($R_x$+$C_x$>6), DIR_S=5, where ($R_x$>3), DIR_SW=6, where ($C_x$<$R_x$), DIR_W=7, where ($C_x$<3), and DIR_NW=8, where ($R_x$+$C_x$<6).

10. The system of claim 8, further comprising:
   deleting at least one row of pixels immediately adjacent to the pixel;
   deleting at least one column of pixels immediately adjacent to the pixel; and
   defining the window of size n×m centered on the current pixel which does not include any pixels in each of the deleted rows and columns.

11. The system of claim 8, wherein in response to the current pixel residing along the two-color edge in the bitmap, further comprising estimating contone color values for the first and second colors of the two-color edge based upon halftone threshold values of the halftone screens used to color the area of the bitmap wherein the current pixel resides.

12. The system of claim 11, further comprising:
   assigning the contone color value estimated for the color on an opposing side of the two-color edge to the pixel; and
   re-halftoning the current pixel using the assigned contone color value.

13. The system of claim 8, further comprising:
   subdividing the window into a plurality of estimate windows and corresponding intermediate estimate windows; and
   determining values for each of the intermediate estimate windows based upon contone color values of a corresponding estimate window and estimate windows which are immediately adjacent to that estimate window.

14. The system of claim 13, further comprising:
   setting c_min and m_min to their respective minimum values of the intermediate estimate windows;
   determining the condition given by:

($c$_min<LOW_COVC)||($m$_min<LOW_COVM), where LOW_COVC is the low cyan coverage, and LOW_COVM is the low magenta coverage; and trapping the pixel in response to the condition having been satisfied.

15. A method for determining whether a color pixel resides along a two-color edge in a bi-level bitmap of a halftoned color image, the method comprising:
   receiving a bitmap of a halftoned color image having a plurality of pixels; and
   for each of a number of pixels in the bitmap:
      partitioning the window into a plurality of regions, with each region having an orientation direction with each orientation direction having an associated numeric value;
      counting a number of pixels of each of the first and second colors in each of the plurality of regions;
      determine which region has a maximum and minimum pixel count for each of the first and second colors; and
      determining whether the current pixel resides along a two-color edge in the bitmap based upon the maximum and minimum pixel counts and each of the associated orientation direction.

16. The method of claim 15, further comprising:
   assigning the contone color value estimated for the color on an opposing side of the two-color edge to the pixel; and
   re-halftoning the current pixel using the assigned contone color value.

17. The method of claim 15, further comprising:
   subdividing the window into a plurality of estimate windows and corresponding intermediate estimate windows; and
   determining values for each of the intermediate estimate windows based upon contone color values of a corresponding estimate window and estimate windows which are immediately adjacent to that estimate window.

18. The method of claim 17, further comprising:
   setting c_min and m_min to their respective minimum values of the intermediate estimate windows;
   determining the condition given by:

($c$_min<LOW_COVC)||($m$_min<LOW_COVM), where LOW_COVC is the low cyan coverage, and LOW_COVM is the low magenta coverage; and trapping the pixel in response to the condition having been satisfied.

19. The method of claim 15, further comprising:
   deleting at least one row of pixels immediately adjacent to the pixel;
   deleting at least one column of pixels immediately adjacent to the pixel; and
   defining the window of size n×m centered on the current pixel which does not include any pixels in each of the deleted rows and columns.

20. The method of claim 15, wherein in response to the current pixel residing along the two-color edge in the bitmap, further comprising estimating contone color values for the first and second colors of the two-color edge based upon halftone threshold values of the halftone screens used to color the area of the bitmap wherein the current pixel resides.

\* \* \* \* \*